(12) United States Patent
Feng et al.

(10) Patent No.: US 10,465,806 B2
(45) Date of Patent: Nov. 5, 2019

(54) VALVE AND VALVE BODY THEREOF

(71) Applicant: NINGBO TEXOON BRASSWORKS CO., LTD., Ningbo, Zhejiang (CN)

(72) Inventors: Zhenhua Feng, Ningbo (CN); Xizhong Wang, Ningbo (CN)

(73) Assignee: NINGBO TEXOON BRASSWORKS CO., LTD., Ningbo, Zhejiang (CN)

( * ) Notice: Subject to any disclaimer, the term of this patent is extended or adjusted under 35 U.S.C. 154(b) by 0 days.

(21) Appl. No.: 15/605,964

(22) Filed: May 26, 2017

(65) Prior Publication Data

US 2018/0259076 A1 Sep. 13, 2018

(30) Foreign Application Priority Data

Mar. 9, 2017 (CN) .......................... 2017 1 0137367

(51) Int. Cl.
| | | |
|---|---|---|
| *F16K 11/087* | (2006.01) | |
| *F16K 27/06* | (2006.01) | |
| *F16K 31/60* | (2006.01) | |
| *F16K 5/06* | (2006.01) | |

(52) U.S. Cl.
CPC ........ *F16K 11/0876* (2013.01); *F16K 5/0605* (2013.01); *F16K 27/067* (2013.01); *F16K 31/602* (2013.01); *Y10T 137/86638* (2015.04)

(58) Field of Classification Search
CPC .... F16K 11/087; F16K 5/0605; F16K 27/067; F16K 31/602; Y10T 137/86638
See application file for complete search history.

(56) References Cited

U.S. PATENT DOCUMENTS

| | | | | |
|---|---|---|---|---|
| 3,674,052 | A | * | 7/1972 | Hartman ............... F16K 5/0605 137/625.21 |
| 3,735,956 | A | * | 5/1973 | Matousek ............. F16K 5/0689 137/454.6 |
| 3,764,052 | A | * | 10/1973 | Scully .................. G11B 15/103 226/176 |
| 4,573,498 | A | * | 3/1986 | Ludwig ............... F16K 11/0876 137/625.47 |
| 4,685,488 | A | * | 8/1987 | Corbin .................... F16K 5/201 137/328 |
| 4,915,133 | A | * | 4/1990 | Harrison ............... F16K 5/0605 137/625.47 |
| 5,304,058 | A | * | 4/1994 | Gill ..................... B29C 45/1735 264/572 |
| 5,988,220 | A | * | 11/1999 | Sakaki ............... F16K 11/0876 137/625.22 |
| 7,681,596 | B2 | * | 3/2010 | Reck ..................... F16K 5/0605 137/625.47 |
| 2001/0032951 | A1 | * | 10/2001 | Stewart ................ F16K 5/0694 251/214 |
| 2005/0252560 | A1 | * | 11/2005 | Anderson ........... F16K 11/0876 137/625.47 |
| 2007/0107789 | A1 | * | 5/2007 | Reck .................. F16K 11/0873 137/887 |

(Continued)

*Primary Examiner* — Eric Keasel
*Assistant Examiner* — Kevin R Barss
(74) *Attorney, Agent, or Firm* — Raymond Y. Chan; David and Raymond Patent Firm

(57) ABSTRACT

A valve includes a valve body having a groove and a fluid guiding element, wherein the fluid guiding element defines at least three channels and a cavity for receiving the valve body therewithin, so as to enable the communication among the channels to be adjusted by rotating the valve body.

5 Claims, 17 Drawing Sheets

(56) References Cited

U.S. PATENT DOCUMENTS

2007/0252015 A1* 11/2007 Norris ................ B60H 1/00485
236/93 R
2014/0305154 A1* 10/2014 Yoshioka ................ F25B 41/04
62/324.6
2018/0094737 A1* 4/2018 Clement ............. F16K 11/0873

* cited by examiner

A1-A1

A2-A2

B3-B3

B1-B1

A2-A2

B2-B2

A3-A3

B1-B1

C1-C1

C2-C2

C3-C3

A2-A2

B1-B1

A2-A2

B1-B1

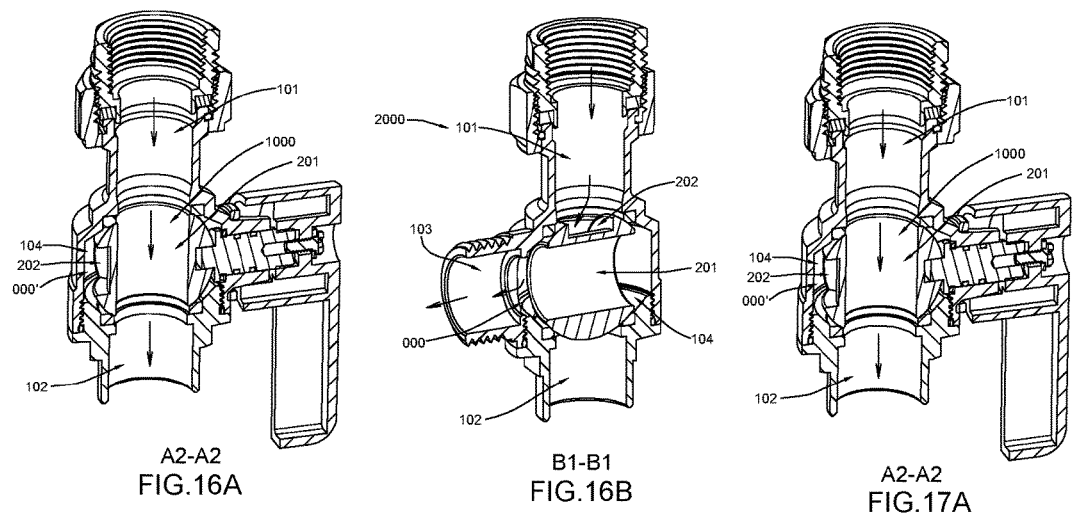
A2-A2
FIG.16A
B1-B1
FIG.16B
A2-A2
FIG.17A
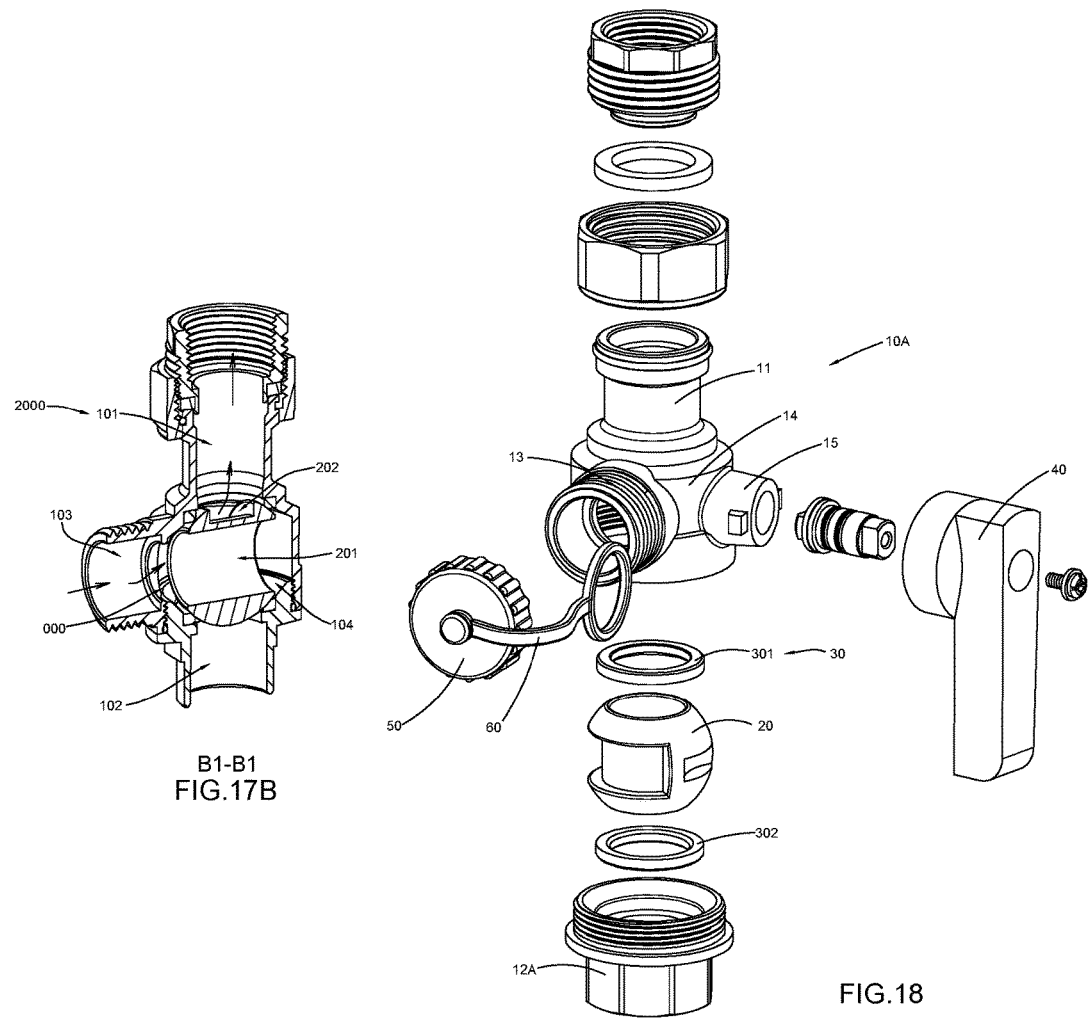
B1-B1
FIG.17B
FIG.18

D-D

E-E

F1-F1

F2-F2

G1-G1

G2-G2

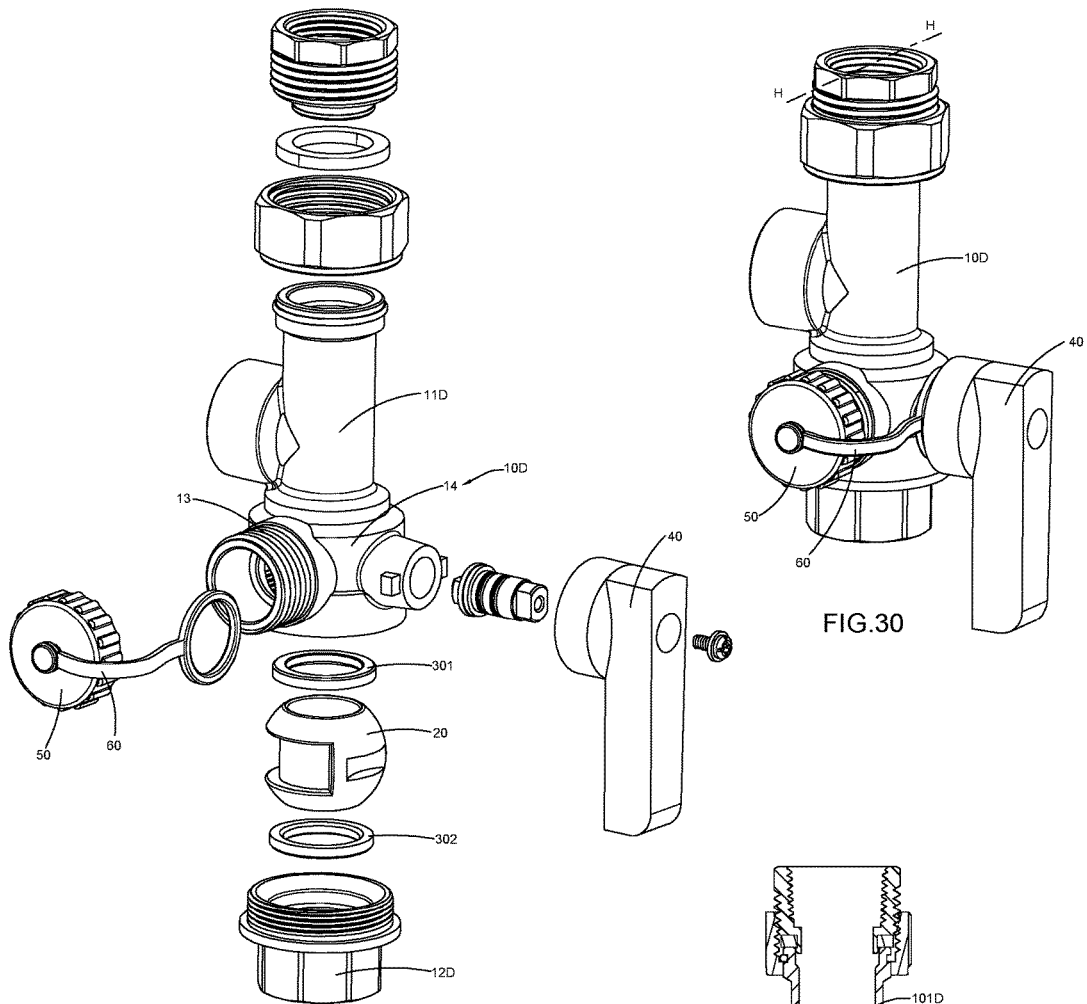
FIG.29
FIG.30
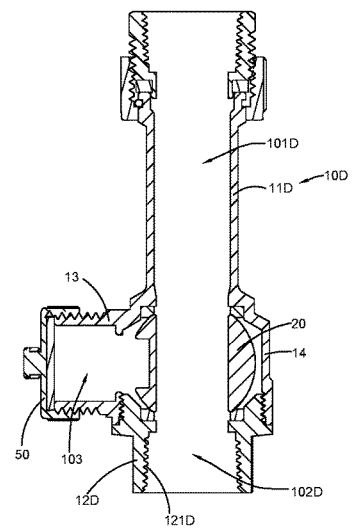
H-H
FIG.31

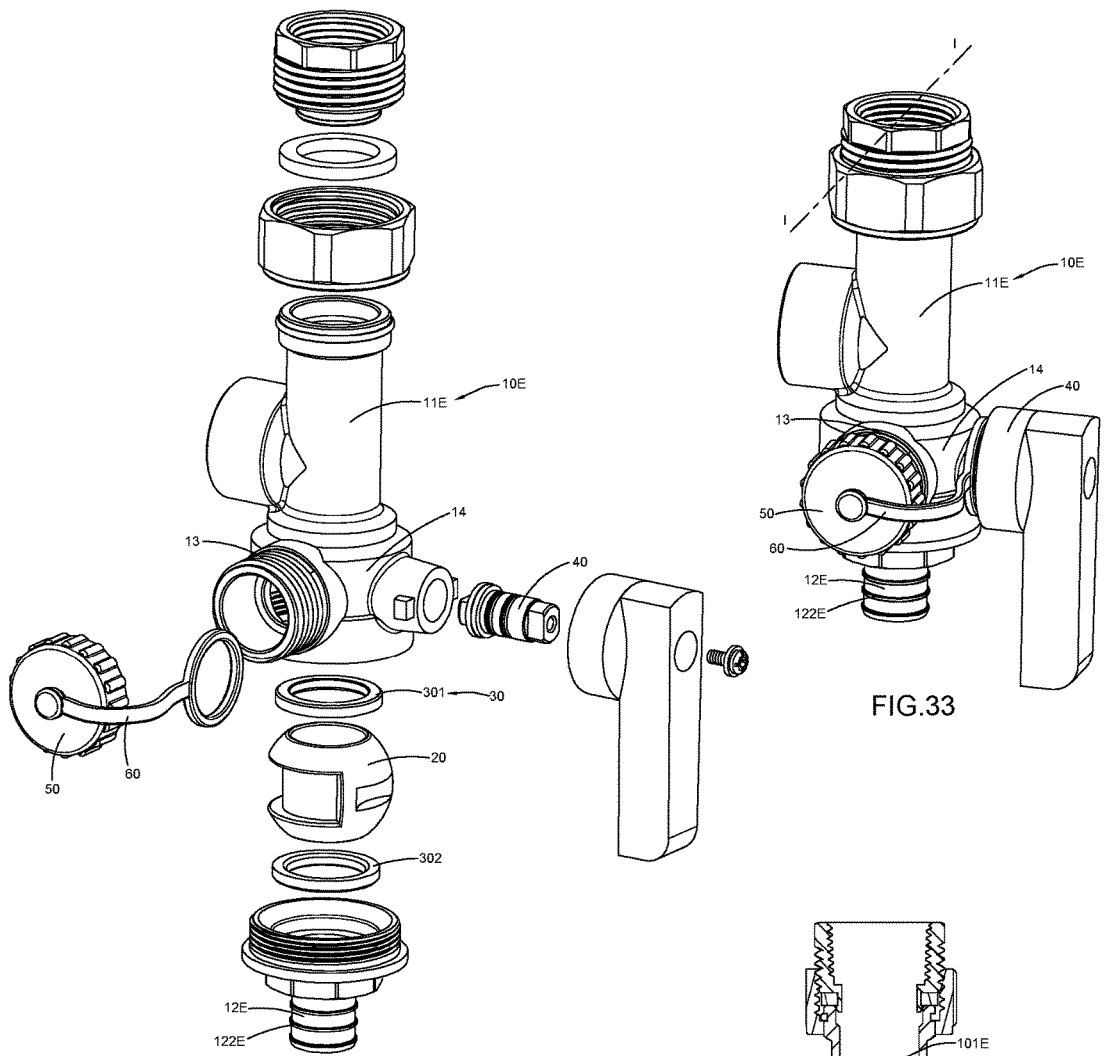
FIG.32
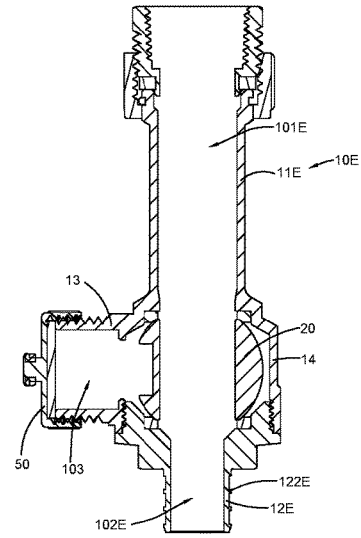
FIG.33
I-I
FIG.34

J-J

K-K

L1-L1

L2-L2

M1-M1

M2-M2

N1-N1

N2-N2

O1-O1

O2-O2

P1-P1

P2-P2

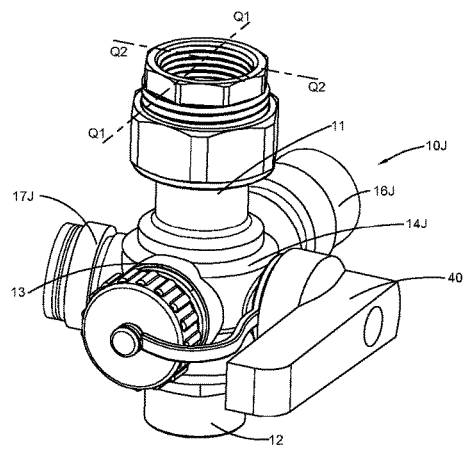
FIG.48
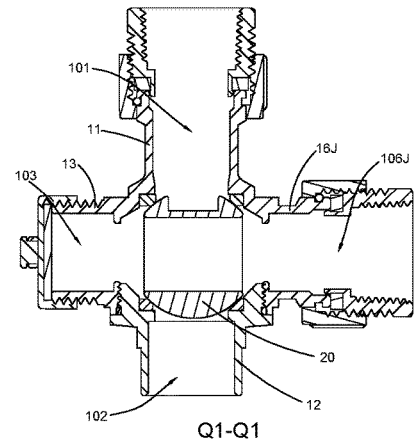
Q1-Q1
FIG.49A
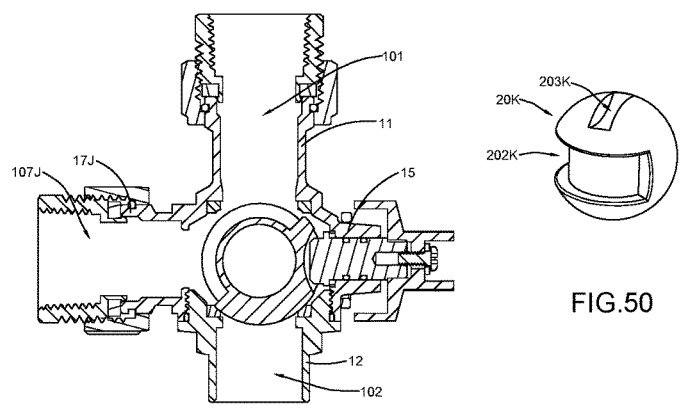
Q2-Q2
FIG.49B
FIG.50
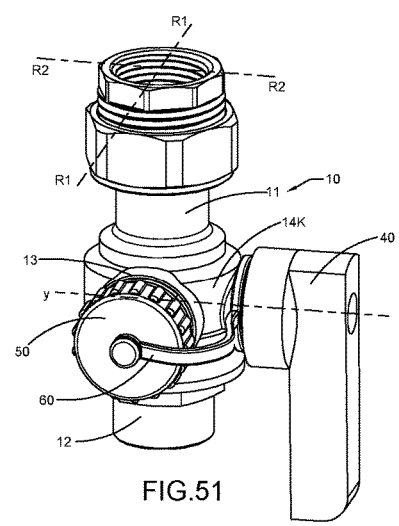
FIG.51
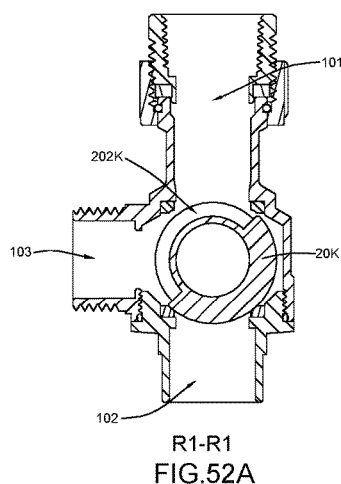
R1-R1
FIG.52A
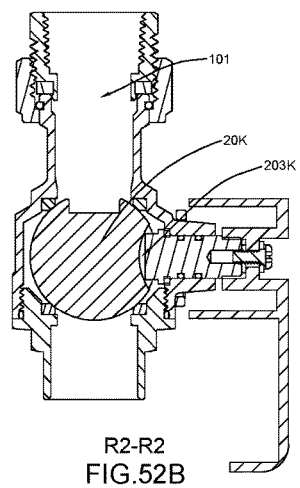
R2-R2
FIG.52B

S1-S1

S2-S2

VALVE AND VALVE BODY THEREOF

CROSS REFERENCE OF RELATED APPLICATION

This is a Chinese application that claims the benefit of priority under 35 U.S.C. § 119 to a non-provisional application, application number 201710137367.1, filed 2017 Mar. 9.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a valve, and more particularly to a valve which has at least three openings.

Description of Related Arts

Valves are widely applied in a wide variety of professions. A valve having three or more channels is very useful. For example, two valves according to the prior art are applied to a water heater, as shown in FIG. 1 of the drawings. An inlet valve 1, one of the two valves, is connected to an inlet of the water heater, so as to control the inflowing of cold water. An outlet valve 2, the other one of the two valves, is connected to an outlet of the water heater, so as to control the outputting of hot water in the water heater.

The water heater may remain some dirt in after being used for some days, so either the inlet valve 1 or the outlet valve 2 is provided with a drain opening being used to drain the dirt in the water heater.

As shown in FIG. 1 to FIG. 2C of the drawings, the inlet valve 1 provides three channels 1a, 1b and 1c. The channel 1a is communicated to the inlet of the water heater. The channel 1b is communicated to a water supply pipe. The channel 1c is provided to drain. The valve 1 has a first ball 1d and a second ball 1e. The first ball 1d has a cavity 1f having three openings 1g, 1h and 1i. The inlet valve 1 has an inflow communication state and a drain communication state.

At the inflow communication state of the inlet valve 1, the opening 1g communicates the cavity 1f to the channel 1a, and the opening 1h communicates the cavity 1f to the channel 1b, so that the water from the water supply pipe can inflow into the water heater through the channel 1b, the cavity 1f and the channel 1a. At the inflow communication state of the inlet valve, the opening 1i faces to the channel 1c, but the water in the channel 1a and 1b will not outflow from the channel 1c due to the blocking of the second ball 1e, as shown in FIG. 2A.

The inlet valve 1 further comprises two valve handles 1j and 1k respectively controlling the direction of the two balls 1d and 1e. The ball 1e provides a through-hole 1l. When there are some dirt in the water heater needs to be cleaned, one must operate the handle 1j first to rotate the ball 1d, so that the ball 1d blocks the communication between the cavity 1f and the channel 1b, so as to ensure the water in the channel 1b will not enter into the cavity 1f, and ensure the water in the cavity if will not enter into the channel 1b. Then the handle 1k should be operated to drive the ball 1e to rotate, so that the through-hole 1l communicates with both the cavity 1f and the channel 1c, so that the water with dirt in the water heater can be drained through the cavity 1f, the through-hole 1l and the channel 1c. The operating is complex and strict. One must apply two operating steps. And the order of the two operating steps should not be reversed. If the operating order of the two valves 1k and 1j is reversed, dirt in the water heater may enter into the channel 1b, and the water in the water supply pipe communicating with the channel 1b may be polluted by the dirt.

As shown in FIGS. 1, 3A, 3B, 3C and 3D of the drawings, the outlet valve 2 has a structure similar with the inlet valve 1. What is different from the valve 1, the valve provides four channels. A ball 2d provides four openings. A fourth opening 2m of the ball 2d communicates a cavity 2f of the ball 2d to a fourth channel 2m, and further to a relief valve 3. Similarly, if there is some dirt in the water heater needs to be drained via the valve 2, one must operate both a handle 2j and a handle 2k.

Whether the valve 1 or the valve 2, the structure is complex, and has so many components. For example, at least two balls and at least two handles are provided. The more components result in that the valves occupy much more space. The maintaining of the valves becomes a harder work. The complex structure also gives each valve a complex appearance, that makes the surrounding of the water heater messier, that will bring much discomfort feeling to consumers.

FIG. 4 illustrates a valve 4 according to the prior art. The valve 4 provides three channels 4a, 4b and 4c. The channel 4a is provided to communicate with a device requiring water. The channel 4b is provided to communicate with a water supply device. The channel 4c is provided to drain. Comparing with the valves 1 and 2, the valve 4 has only one ball 4d and only one handle. The ball 4d has a cavity 4f having three openings 4g, 4h and 4i. At an inflow communication state of the valve 4, the opening 4g communicates the cavity 4f to the channel 4a, and the opening 4h communicates the cavity 4f to the channel 4b, so that the water from the water supply device can flow into the device requiring water through the cavity 4f At the inflow communication state of the valve 4, the opening 4i faces to the channel 4c, but the water in the channels 4a and 4b will not outflow from the channel 4c due to a sealing member 4j and a cover 4k are provided. The sealing member 4j is provided to prevent the water in the cavity 4f from being leaked to the surface of the ball 4d through the opening 4i. The cover 4k is provided to prevent the water in the cavity 4f from outflowing through the channel 4c. At a drain communication state of the valve 4, the ball 4d is driven to rotate, so as to block the communication between the cavity 4f and the channel 4b, and the channel 4a and the channel 4c communicate with each other through the opening 4i, the cavity 4f and the opening 4h, so that the water from the channel 4a can be drained. As mentioned above, at the inflow communication state, the cover 4k plays an important role of blocking, wherein the cover 4k may bear great pressure from the water in the channel 4c. The pressure from the water in the channel 4c may bring a risk of damaging the cover 4k. If the cover 4k is damaged, the water from both the channel 4a and the channel 4b may be leaked out, that may damage the environment of a house. Even if the consumer has found the damaging of the cover 4k timely, and the leaking is avoided, the damaging of the cover 4k makes the valve 4 cannot be used any more before the cover 4k is repaired or replaced.

It is worth to be mentioned that, at the inflow communication state, the passage of inflowing of the valve 4 is not so straight due to the water from the channel 4b to the channel 4a may pass through part of the channel 4c, so the water from the channel 4b to the channel 4a may pass through many corners which may store dirt easily. The dirt stored in the corners may enter into the device requiring water together with water from the channel 4b. Then the device requiring water will be polluted. The valves 1 and 2 also have this kind of hidden trouble.

SUMMARY OF THE PRESENT INVENTION

The invention is advantageous in that it provides a valve and a valve body thereof, wherein at least two communication states of the valve can be controlled and be selected, so as to control the direction of fluid, such as water.

Another advantage of the invention is to provide a valve and a valve body thereof, wherein two communication states of the valve can be controlled and be selected, so as to control the direction of fluid, such as water.

Another advantage of the invention is to provide a valve and a valve body thereof, wherein the valve has at least three channels which can be controllably applied according to different requirements.

Another advantage of the invention is to provide a valve and a valve body thereof, wherein only one ball is applied to selectively control two different directions of fluid therethrough.

Another advantage of the invention is to provide a valve and a valve body thereof, wherein only one ball is applied to selectively control two different directions of fluid therethrough, and the application thereof is safety.

Another advantage of the invention is to provide a valve and a valve body thereof, wherein only one ball is applied to realize the selection from two different flow directions of fluid, such as water.

Another advantage of the invention is to provide a valve and a valve body thereof, wherein the structure of the valve is simple, so that the manufacture method thereof is simply, and is easy to be applied.

Another advantage of the invention is to provide a valve and a valve body thereof, wherein the structure of the valve is simple, and the appearance thereof is compact.

Another advantage of the invention is to provide a valve and a valve body thereof, wherein the application of the valve is safety to avoid the water from being leaked due to the pressure of water.

Another advantage of the invention is to provide a valve and a valve body thereof, wherein when either flow passage of two predetermined flow passages of the valve is applied, the other fluid passage thereof is safely closed to avoid fluid leaking.

Another advantage of the invention is to provide a valve and a valve body thereof, wherein at a first communication state of the valve, a passage formed by two channels of the valve and a hole of a fluid guiding element is straight, and the water therethrough doesn't pass through so many corners, so as to ensure the clean of the water.

Another advantage of the invention is to provide a valve and a valve body thereof, wherein at a state of the valve, there are little corners in a communication passage, so as to keep the fluid passing through clean.

Another advantage of the invention is to provide a valve and a valve body thereof, wherein at a state of the valve, there are little corners in a communication passage, so as to keep the water passing through clean.

Another advantage of the invention is to provide a valve and a valve body thereof, wherein at a state of the valve, a clean water passage is formed, wherein the clean water passage is straight, so as to avoid the water from being polluted by dirt stored to some corners.

Another advantage of the invention is to provide a valve and a valve body thereof, wherein a passage for clean water is straight, so that the clean water will not pass through so many corners.

Another advantage of the invention is to provide a valve and a valve body thereof, wherein a passage for clean water is straight, so that the flowing path of the clean water is straight, so that the clean water flows steadily.

Additional advantages and features of the invention will become apparent from the description which follows, and may be realized by means of the instrumentalities and combinations particular point out in the appended claims.

According to the present invention, the foregoing and other objects and advantages are attained by a valve comprising a valve body having a groove and a fluid guiding element. The fluid guiding element provides a cavity and at least three channels. The valve body is provided into the cavity, so as to control the communication among the channels.

In accordance with another aspect of the invention, the present invention comprises a valve comprising a fluid guiding element. The fluid guiding element provides a first opening, a second opening, and a third opening. At a first state, the first opening communicates with the second opening, and the third opening does not communicate with either the first opening or the second opening. At a second state, the first opening communicates with the third opening, and the second opening does not communicate with either the first opening or the third opening.

In accordance with another aspect of the invention, the present invention comprises a valve comprising a fluid guiding element. The fluid guiding element provides a first channel, a second channel, and a third channel. At a first state, the first channel communicates with the second channel, and the third channel does not communicate with either the first channel or the second channel. At a second state, the first channel communicates with the third channel, and the second channel does not communicate with either the first channel or the third channel.

In accordance with another aspect of the invention, the present invention comprises a valve body for a valve. The valve body defines a groove.

In some embodiments of the present invention, the groove is formed to the external surface of the valve body.

In some embodiments of the present invention, the valve body further defines a hole separating with the groove.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIGS. 16A and 16B illustrate a third application of the valve according to the above first preferred embodiment of the present invention, illustrating the communication direction of the valve.

FIGS. 17A and 17B illustrate a fourth application of the valve according to the above first preferred embodiment of the present invention, illustrating the communication direction of the valve.

FIG. 18 is an explosive perspective view of a valve according to a first alternative mode of the above first preferred embodiment of the present invention.

FIG. 29 is an explosive perspective view of a valve according to a first alternative mode of the above second preferred embodiment of the present invention.

FIG. 30 is a perspective view of the valve according to the above first alternative mode of the above second preferred embodiment of the present invention.

FIG. 31 is a sectional view of the valve according to the above first alternative mode of the above second preferred embodiment of the present invention.

FIG. 32 is an explosive perspective view of a valve according to a second alternative mode of the above second preferred embodiment of the present invention.

FIG. 33 is a perspective view of the valve according to the above second alternative mode of the above second preferred embodiment of the present invention.

FIG. 34 is a sectional view of the valve according to the above second alternative mode of the above second preferred embodiment of the present invention.

FIG. 48 is a perspective view of a valve according to the above seventh preferred embodiment of the present invention, illustrating a second state of the valve.

FIGS. 49A and 49B are sectional views of the valve according to the above seventh preferred embodiment of the present invention, illustrating the second state of the valve.

FIG. 50 is a perspective view of a valve body of a valve according to an eighth preferred embodiment of the present invention, illustrating a first state of the valve.

FIG. 51 is a perspective view of the valve according to the above eighth preferred embodiment of the present invention, illustrating a first state of the valve.

FIGS. 52A and 52B are sectional views of the valve according to the above eighth preferred embodiment of the present invention, illustrating the first state of the valve.

DETAILED DESCRIPTION OF THE PREFERRED EMBODIMENT

Figure 1:
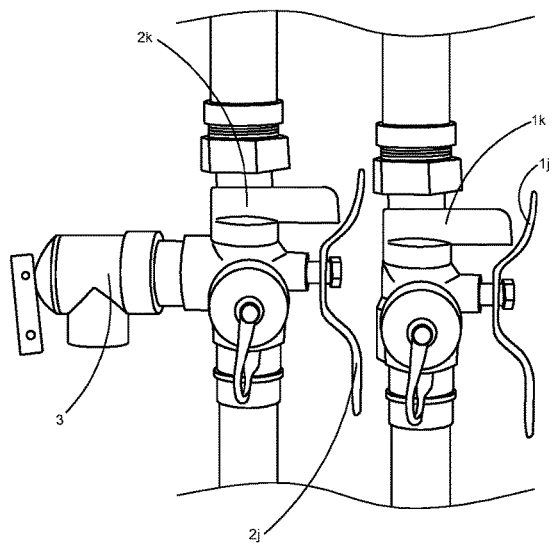
FIG. 1 illustrates the application of two valves according to the prior art.
Figure 2A:
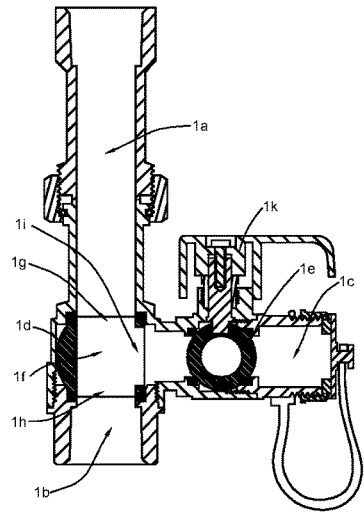
FIG. 2A is a sectional view of an inlet valve according to the prior art, illustrating an inflow communication state of the valve.
Figure 2B:
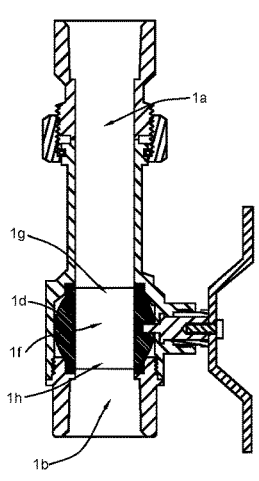
FIG. 2B is another sectional view of the inlet valve according to the prior art, illustrating the inflow communication state of the inlet valve.
Figure 2C:
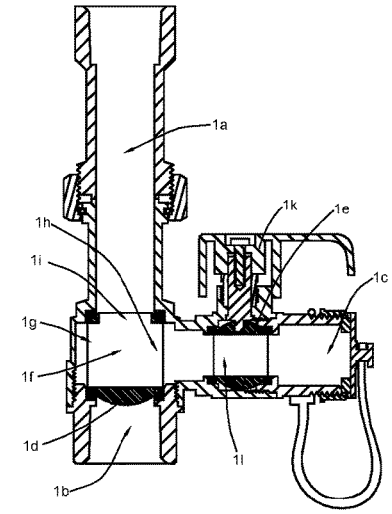
FIG. 2C is another sectional view of the inlet valve according to the prior art, illustrating a drain communication state of the inlet valve.
Figure 2D:
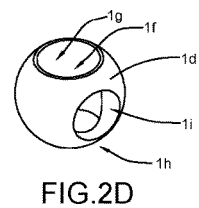
FIG. 2D is a perspective view of a first ball of the inlet valve according to the prior art.
Figure 3A:
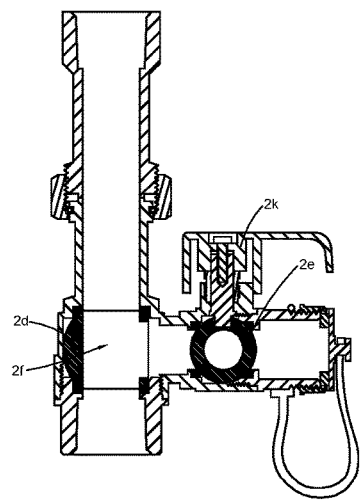
FIG. 3A is a sectional view of an outlet valve according to the prior art.
Figure 3B:
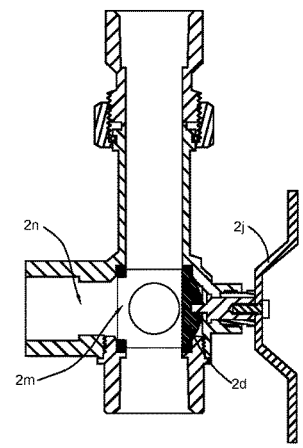
FIG. 3B is another sectional view of the outlet valve according to the prior art.
Figure 3C:
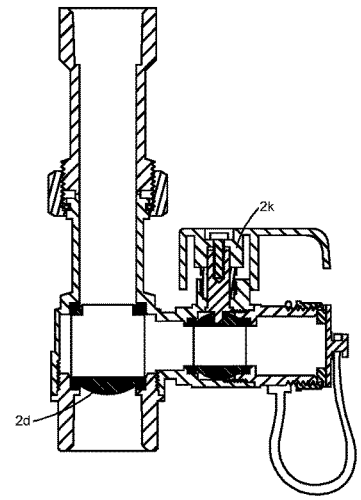
FIG. 3C is another sectional view of the outlet valve according to the prior art.
Figure 3D:
FIG. 3D is a perspective view of a ball of the outlet valve according to the prior art.
Figure 4A:
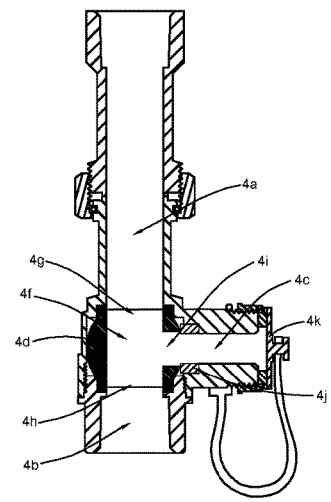
FIG. 4A is a sectional view of another valve according to the prior art, illustrating an inflow communication state of the valve.
Figure 4B:
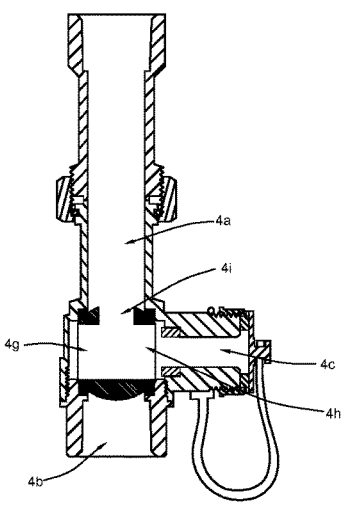
FIG. 4B is another sectional view of the above another valve according to the prior art, illustrating a drain communication state of the valve.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

FIGS. 5 to 13B illustrate a valve according to a first preferred embodiment of the present invention. The valve comprises a fluid guiding element 10 and a valve body 20. The fluid guiding element 10 has a cavity 104 and three channels 101, 102 and 103. Before the valve body 20 is provided into the cavity 104, the three channels 101, 102 and 103 are respectively communicated with the cavity 104. In other words, the cavity 104 is communicated with the three channels 101, 102 and 103 before the valve body 20 is provided within the cavity 104. The valve body 20 is provided within the cavity 104 to selectively control the communication among the three channels 101, 102 and 103. In detail, the valve body 20 is provided to control the channel 101 to be communicated with the channel 102 or the channel 103, so as to selectively define the communication passage of the valve, so as to guide fluid to flow at a predetermined direction, such as water fluid. In other words, the valve body 20 is provided to control the communication between the channel 101 and the channel 102, and the communication between the channel 101 and the channel 103.

According to the first preferred embodiment of the present invention, the valve body 20 provides two different passages at two different states of the valve, so as to communicate different channels. In detail, the valve body 20 provides a communication hole 201 and a groove 202. The communication hole 201 and the groove 202 are separated with each other. According to the first preferred embodiment of the present invention, the valve body 20 is embodied as a ball which has a shape of sphere having the communication hole 201 and the groove 202. The communication hole 201 extends along an axis of the ball, i.e. an axis of the valve body 20. According to the first preferred embodiment of the present invention, the shape of the communication hole 201 is cylindrical. The axis of the cylindrical communication hole 201 coincides with the axis of the valve body 20, so that the size of the communication hole 201 is large enough to serve more water.

The groove 202 is provided along an external surface of the valve body 20. The valve body 20 is capable of being rotated, so that the valve has two different states.

When the valve is at the first state, the communication hole 201 is communicated with the channel 101 and the channel 102, so that the channel 101 and the channel 102 are communicated with each other through the communication hole 201, so that fluid, such as water, can flow from the channel 101 to the channel 102, or from the channel 102 to the channel 101. Therefore, the channel 101, the communication hole 201 and the channel 102 can form a first passage 1000 of the valve, when the valve is at the first state. The communication hole 201 plays a role of communicating the channel 101 with the channel 102 at the first state of the valve. In detail, the channel 101 has a channel opening 1011. The channel 102 has a channel opening 1021. The channel 103 has a channel opening 1031. When the valve is at the first state, fluid can flow from the channel opening 1021 to the channel opening 1011 through the passage 1000. The fluid passing through the passage 1000 will not reach to the channel opening 1031.

When the valve is at a first state, the communication between the channel 103 and the channel 101 and the communication between the channel 103 and the channel 102 is blocked by the valve body 20, so that the channel 103 is not communicated with either the channel 101 or the channel 102, as shown in FIGS. 7A-8B.

In other words, at the first state, the communication between the channel 101 and the channel 102 is the only communication among the channel 101, the channel 102 and the channel 103.

Figure 12A:
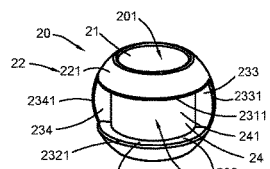
FIG. 12A is a perspective view of a valve body of the valve according to the above first preferred embodiment of the present invention.

As shown in FIG. 12A, the valve body 20 has an internal surface 21 and an external surface 22. The internal surface 21 of the valve body 20 surrounds the communication hole 201. In other words, the communication hole 201 is provided to form the internal surface 21 of the valve body 20.

The external surface 22 comprises a ball surface 221.

The groove 202 is defined by a surrounding wall 23 and a side wall 24 integrally connecting with the surrounding wall 23. The communication hole 201 and the groove 202 are separated by the side wall 24.

The surrounding wall 23 has four surrounding surfaces 231, 232, 233 and 234. The four surrounding surfaces 231, 232, 233 and 234 respectively have four external edges 2311, 2321, 2331 and 2341. In other words, the surrounding surface 231 has the external edge 2311. The surrounding surface 232 has the external edge 2321. The surrounding surface 233 has the external edge 2331. The surrounding surface 234 has the external edge 2341.

The side wall 24 has a side surface 241. According to the first preferred embodiment of the present invention, the side surface 241 is embodied as a cambered surface. The axis of the cambered surface, i.e. the axis of the side surface 241 coincides with the axis of the communication hole 201, so that the thickness of the side wall 24 is uniform.

In more detail, the groove 202 is defined by the four surrounding surfaces 231, 232, 233, 234 and the side surface 241.

The four surrounding surfaces 231, 232, 233, 234, the side surface 241 and the ball surface 221 form the external surface 22 of the valve body 20. In other words, the external surface 22 of the valve body 20 comprises the four surrounding surfaces 231, 232, 233, 234, the side surface 241 and the ball surface 221.

The fluid guiding element 10 has a cavity surface 101. The cavity surface 141 of the fluid guiding element 10 defines the cavity 104.

When the valve is at the second state, the channel 101 communicates with the channel 103. In more detail, the channel 101 communicates with the groove 202. The groove 202 communicates with a space 000 formed between the cavity surface 141 of the fluid guiding element 10 and the ball surface 221 of the valve body 20. The space 000 communicates with both the communication hole 201 and the channel 103, so that the channel 101, the groove 202, the space 000, the communication hole 201 and the channel 103 form a second passage 2000 of the valve, when the valve is at the second state. In other words, the channel 101 and the channel 102 communicate with each other through the groove 202, the space 000 and the communication hole 201.

In detail, when the valve is at the first state, fluid flows from the channel opening 1011 to the channel opening 1031 through the passage 2000. The fluid passing through the passage 2000 will not reach to the channel opening 1021.

When the valve is at the second state, the channel 102 is blocked by the valve body 20, so that the channel 102 isn't communicated with either the channel 101 or the channel 103, as shown in FIGS. 10A~11B. In other words, the communication between the channel 101 and the channel 103 is the only communication among the channel 101, the channel 102 and the channel 103, when the valve is at the second state.

Figure 6A:
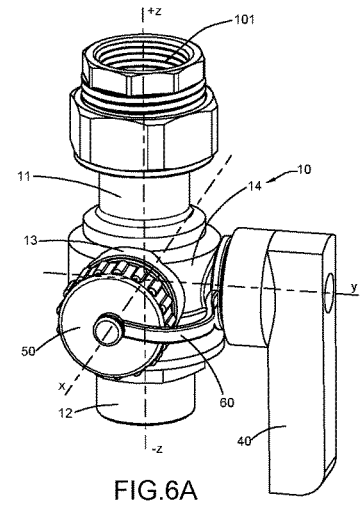
FIGS. 6A and 6B are perspective views of the valve according to the above first preferred embodiment of the present invention, illustrating a first state of the valve.
Figure 6B:
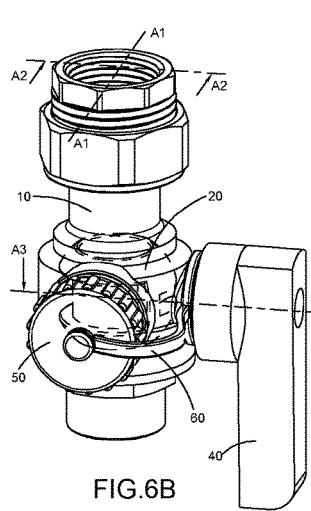
Figure 7A:
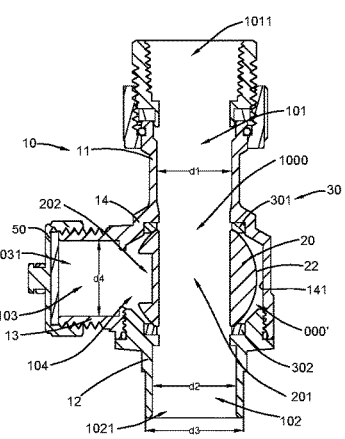
FIGS. 7A and 7B are cross-sectional views of the valve according to the above first preferred embodiment of the present invention, illustrating the first state of the valve.

According to the first preferred embodiment of the present invention, the channel 101 and the channel 102 extend along a same axis, such as z-axis, as shown in FIGS. 6A and 7A. When the valve is at the first state, the communication hole 201 also extends along z-axis, so that the passage 1000 formed by the channel 101, the communication hole 201 and the channel 102 is straight, and there is no so many corners in the passage 1000.

According to the first preferred embodiment of the present invention, the channel 103 extends along an axis being vertical with the extending direction of the channel 101 and the channel 102, i.e. being vertical with z-axis, such as extends along x-axis, as shown in FIGS. 6A and 7A of the drawings.

Figure 5:
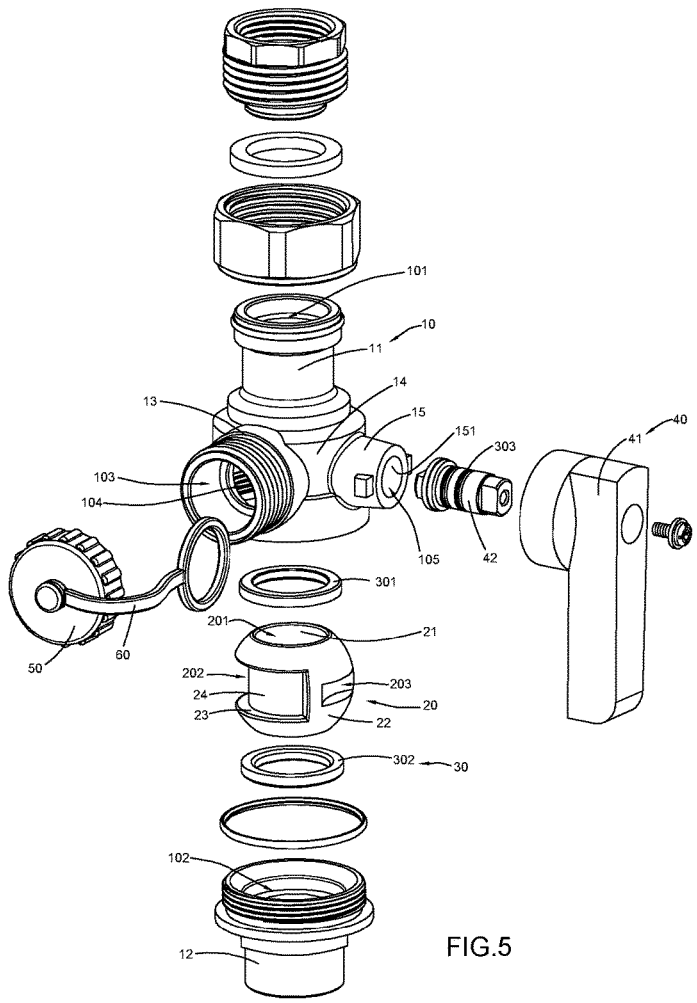
FIG. 5 is an explosive perspective view of a valve according to a first preferred embodiment of the present invention.

As can be seen in FIG. 5 of the drawings, the valve further comprises a plurality of sealing members 30, so as to ensure the leakproofness of the valve, so as to avoid leaking. In detail, the sealing members 30 comprise two sealing members 301 and 302 being provided between the valve body 20 and the fluid guiding element 10. According to the first preferred embodiment of the present invention, the two sealing members 301 and 302 are respectively provided to two opposite positions of the fluid guiding element 10.

In more detail, the fluid guiding element 10 comprises three guiding elements 11, 12, 13 and a housing 14. The guiding elements 11, 12, and 13 respectively define the channel 101, 102, and 103. In other words, the guiding element 11 defines the channel 101. The guiding element 12 defines the channel 102. The guiding element 13 defines the channel 103. The housing 14 defines the cavity 104. The three guiding elements 11, 12, 13 respectively extend from the housing 14 in three different directions, such as +z direction, −z direction and x direction, as shown in FIG. 6A of the drawings.

According to the first preferred embodiment of the present invention, the guiding element 11 integrally extends from the housing 14 in +z direction, as shown in FIG. 6A of the drawings. The guiding element 12 is connected to the housing 14 in a threaded connection manner. The guiding element 13 is integrally extends from the housing 14 in x direction.

According to the first preferred embodiment of the present invention, the two sealing members 301 and 302 are respectively provided to the guiding elements 11 and 12.

When the valve is at the first state, the sealing member 301 contacts with the ball surface 221 of the valve body 20 at a position surrounding one end opening of the hole 101, so as to play a sealing role between the guiding element 11 and the ball surface 221 of the valve body 20, so that the channel 101 does not communicate with a space 000' formed between the ball surface 221 of the valve body 20 and the cavity surface 141 of the fluid guiding element 10, so that fluid, such as water, will not flow between the channel 101 and the space 000'.

Similarly, when the valve is at the first state, the sealing member 302 contacts with the ball surface 221 of the valve body 20 at a position surrounding a second edge 1012 of the hole 101, so as to play a sealing role between the guiding element 12 and the ball surface 221 of the valve body 20, so that the channel 102 does not communicate with the space 000', so that fluid, such as water will not flow between the channel 102 and the space 000'.

When the valve is at the first state, the first passage 1000 is formed. The fluid passing through the first passage 1000 will not enter into the space 000', and will not enter into the hole 101 and the channel 103, so as to avoid leaking.

When the valve is at the second state, the sealing member 302 contacts with the ball surface 221 of the valve body 20, so as to play a sealing role between the guiding element 12 and the ball surface 221 of the valve body 20, so that the channel 102 does not communicate with the space 000, so that fluid, such as water, will not flow between the channel 102 and the space 000.

When the valve is at the second state, the second passage 2000 is formed. The fluid passing through the second passage 2000 will not enter into the channel 102, and the fluid in the channel 102 will not enter into the passage.

As shown in FIG. 5 of the drawings, the valve further comprises an adjusting element 40, so as to adjust the conversion between the first state to the second state. In more detail, the valve body 20 provides a fixing cave 203. Accordingly, the adjusting element 40 comprises an adjusting body 41 and a fixing element 42. The fixing element 42 integrally extends from the adjusting body 41, so that the connection between the adjusting body 41 and the fixing element 42 is strong. The shape and size of the fixing element 42 correspond with the size and shape of the fixing cave 203. The adjusting body 41 is provided outside the fluid guiding element 10, so as to be operated expediently. The fixing element 42 is extended into the fluid guiding element 10, and further extended into the fixing cave 203, so that the valve body 20 is able to be driven by the adjusting element 40.

In more detail, the fluid guiding element 10 provides a through hole 105. The fixing member 42 extends through the through hole 105, so that the fixing member 42 can reach into the fluid guiding element 10, and further reach to the fixing cave 203.

As can be seen in FIG. 5 of the drawings, the fluid guiding element 10 further comprises a through hole wall 15. The through hole 105 is defined by the through hole wall 15. The through hole wall 15 has a through hole surface 151 surrounding the through hole 105.

As can be seen in FIG. 5 of the drawings, the sealing members 30 further comprises at least one fixing member sealing member 303 provided around the surface of the fixing member 42, so as to seal the gap between the fixing member 42 and the through hole surface 151, so as to avoid fluid, such as water, being leaked through the gap between the fixing member 42 and the through hole surface 151.

According to the first preferred embodiment of the present invention, the adjusting body 41 is embodied as a handle which can be driven easily.

According to the first preferred embodiment of the present invention, the adjusting body 41 is able to be rotated, so that the valve body 20 is driven to rotate, so that the direction of the valve body 20 is changed, so that the state of the valve is converted.

According to the first preferred embodiment of the present invention, the valve at the first state can be transferred into the second state via driving the adjusting body with a predetermined angle, such as 90°. Similarly, the valve at the second state can be transferred into the first state via driving the adjusting body to rotate the predetermined angle.

According to the first preferred embodiment of the present invention, the sealing members 301 and 302 are respectively embodied as two sealing rings.

Figure 12B:
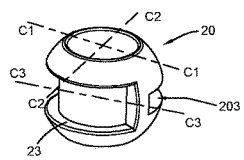
FIG. 12B is another perspective view of the valve body of the valve according to the above first preferred embodiment of the present invention.
Figure 12C:
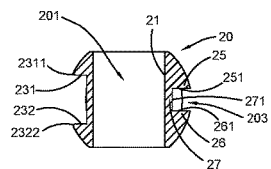
FIG. 12C is a sectional view of the valve body according to the above first preferred embodiment of the present invention.
Figure 12D:
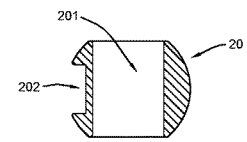
FIG. 12D is a sectional view of the valve body according to the above first preferred embodiment of the present invention.
Figure 12E:
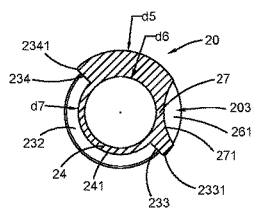
FIG. 12E is a sectional view of the valve body according to the above first preferred embodiment of the present invention.

As shown in FIGS. 12A, 12B and 12E of the drawings, the external edge 2311 of the surrounding surface 231 of the surrounding wall 23 is arc-shaped, which defines a first circle. The external edge 2321 of the surrounding surface 232 of the surrounding wall 23 is arc-shaped, which defines a second circle.

The hole 201 has two opposite hole openings 2011 and 2012. When the valve is at the first state, the position of the sealing member 301 is between the first circle defined by the external edge 2311 and the opening 2011 of the hole 201, and the position of the sealing member 302 is between the second circle defined by the external edge 2321 and the opening 2012 of the hole 201. In other words, the position of the sealing member 301 is between the external edge 2311 of the surrounding surface 231 of the surrounding wall 23 and the opening 2011 of the hole 201. The position of the sealing member 302 is between the external edge 2321 of the surrounding surface 232 of the surrounding wall 23 and the opening 2012 of the hole 201.

It is worth mentioning that except the function of sealing, the two opposite sealing members 301 and 302 also play roles of fixing the position of the valve body 20, so that after the valve body 20 is rotated, the position of the central point 0 of the valve body 20 is kept in the same position, so that the communication directions of the valve can be controlled in a predetermined manner.

According to the first preferred embodiment of the present invention, the valve body 20 is able to be driven to rotate with respect to y-axis passing through the central point 0 of the valve body 20, as can be seen in FIG. 6A of the drawings, so that the states of the valve body 20 can be converted between the first state and the second state.

It is worth mentioning that, when the valve is at the second state, at least one of the four external edges 2311, 2321, 2331 and 2341 passes through the position corresponding with the sealing member 301, so that the groove 202 communicates with the channel 101 and the space 000, so that the channel 101 and the space 000 communicates with each other, so that the channel 103 communicating with the space 000 communicates with the channel 101.

According to the first preferred embodiment of the present invention, when the valve is at the second state, the position of the third external edge 2331 of the surrounding surface 233 of the surrounding wall 23 is surrounded by the sealing member 301, so that the groove 202 communicates with the channel 101, and the valve body 20 can be fixed steadily.

Figure 7B:
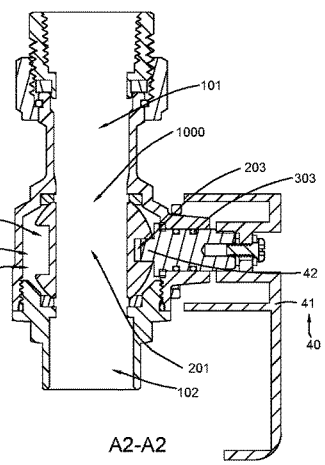
Figure 9B:
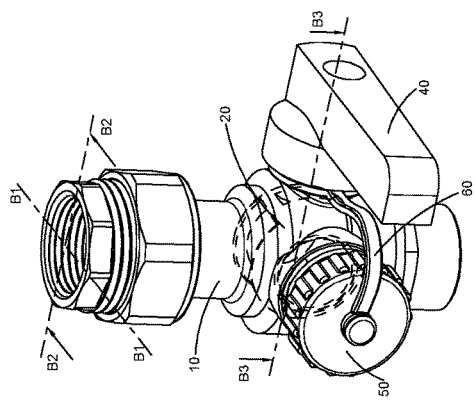
FIGS. 9A and 9B are perspective views of the valve according to the above first preferred embodiment of the present invention, illustrating a second state of the valve.
Figure 11B:
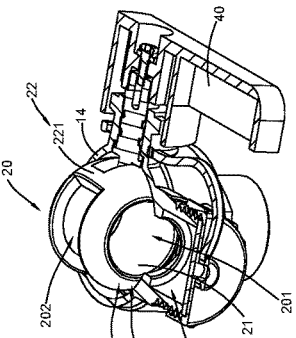
FIGS. 11A and 11B are sectional views of the valve according to the above first preferred embodiment of the present invention, illustrating the second state of the valve.
Figure 9A:
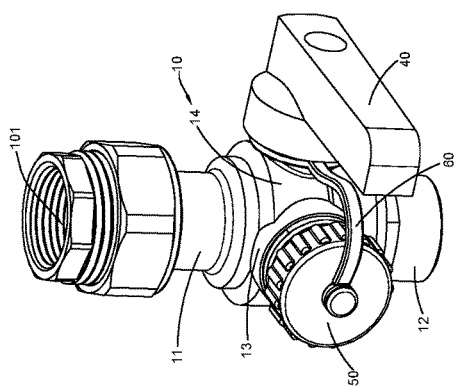
Figure 11A:
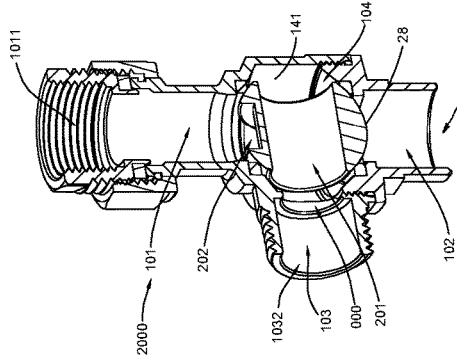
Figure 8B:
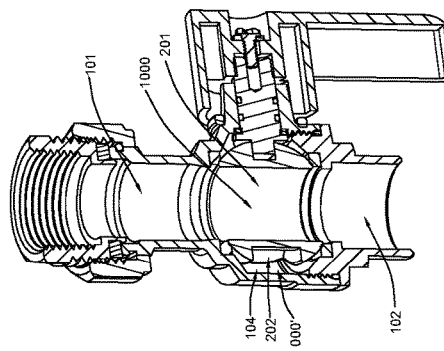
FIGS. 8A and 8B are sectional views of the valve according to the above first preferred embodiment of the present invention, illustrating the first state of the valve.
Figure 10B:
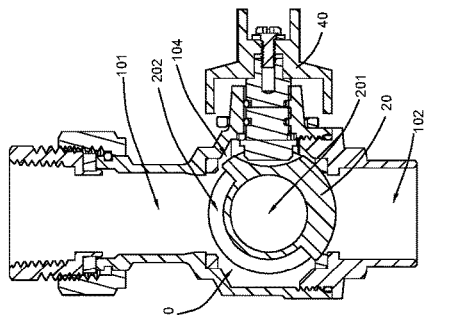
FIGS. 10A and 10B are cross-sectional views of the valve according to the above first preferred embodiment of the present invention, illustrating the second state of the valve.
Figure 8A:
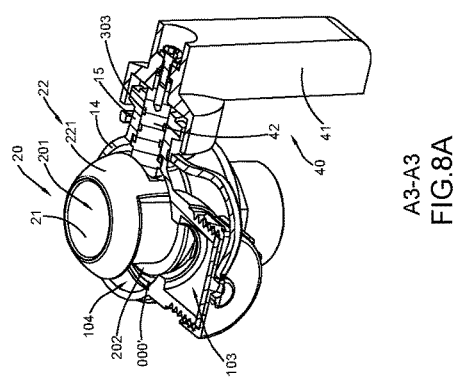
Figure 10A:
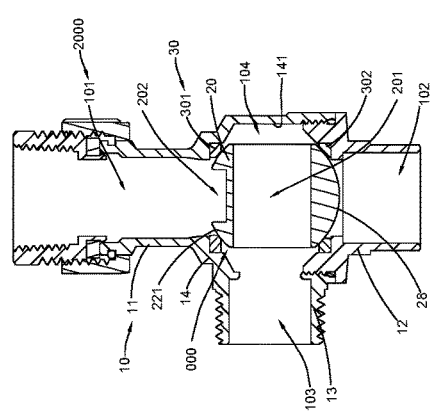

When the valve is at the second state, the position of the fourth external edge 2341 of the surrounding surface 234 of the surrounding wall 23 is between the near edges of the two sealing members 301 and 302, so that the groove 202 communicates with the space 000, and not communicates with the channel 102, so as to ensure the channel 101 and the channel 103 communicate with each other, but not communicate with the channel 102. For example, the position of the fourth external edge 2341 of the surrounding surface 234 of the surrounding wall 23 is between the left edge of the sealing member 301 and the left edge of the sealing member 302, as shown in FIGS. 7A and 7B of the drawings.

As shown in FIG. 5 and FIG. 6A of the drawings, the valve further comprises a cap 50. When the valve is at the first state, the cap 50 is provided to cover a channel opening 130 of the guiding element 13, so as to avoid dirt from entering into the channel 103.

During the converting from the first state of the valve to the second state of the valve, the cap 50 can be used to cover the channel opening 130 of the guiding element 13, so as to avoid the fluid, such as water, from the channel 102 spilling through the channel 103.

As shown in FIG. 5 and FIG. 6A of the drawings, the valve further comprises a connection element 60 connecting the cap 50 to the fluid guiding element 10, so as to avoid the cap 50 from being lost. According to the first preferred embodiment of the present invention, one side of the connection element 60 is fixed to the cap 50, and the other side of the connection element 60 is fixed to the through hole wall 15 of the fluid guiding element 10.

It is worth mentioning that the guiding element 13 can not only connect with the cap 50, but also can connect with other device, such as a water pipe.

According to the first preferred embodiment of the present invention, the guiding elements 11, 12, 13 are respectively embodied as guiding pipes extending from the housing 14. The inner diameter of the guiding element 11 is d1. The inner diameter of the guiding element 12 is d2. The external diameter of the guiding element 12 is d3. The inner diameter of the guiding element 13 is d4. According to the first preferred embodiment of the present invention, d1=20 mm; d2=22.3 mm; d3=26 mm; d4=20 mm.

The diameter of the valve body 20 is d5. According to the first preferred embodiment of the present invention, d5=33 mm.

Figure 12F:
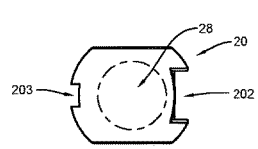
FIG. 12F is a side view of the valve body according to the above first preferred embodiment of the present invention.
Figure 13A:
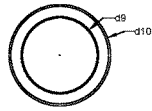
FIG. 13A illustrates a sealing member of the valve according to the above first preferred embodiment of the present invention.
Figure 13B:
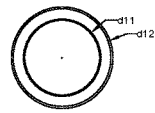
FIG. 13B illustrates another sealing member of the valve according to the above first preferred embodiment of the present invention.

As shown in FIG. 12F of the drawings, the valve body 20 has a sealing area 28. When the valve is at the second state, the sealing area 28 of the valve body 20 is surrounded by the sealing member 302, so as to block the channel 102, as shown in FIGS. 10A-11A of the drawings.

It is worth mentioning that the groove 202 is not extended to the sealing area 28, so as to avoid the channel 102 being communicated to the groove 202, when the valve is at the second state.

In the other direction, the groove 202 does not extends to the fixing cave 203, so as to avoid the valve body 20 from rolling in the cavity 104, so as to ensure the valve perform well.

The fixing cave 203 is defined by two holding walls 25, 26 and a blocking wall 27. The holding wall 25 has a holding surface 251. The holding wall 26 has a holding surface 261. The fixing cave 203 is provided between the holding surface 251 and the holding surface 261. The holding surface 251 together with the holding surface 261 holds the fixing member 42 into the fixing cave 203. According to the first preferred embodiment of the present invention, the holding surface 251 parallels with the holding surface 261. The distance between the holding surface 251 and the holding surface 261 corresponds with the width of the fixing member 42, so that the valve body 20 can be mounted easily, and that the valve body 20 can be driven well.

The blocking wall 27 is provided to separate the fixing cave 203 and the hole 201, so as to avoid fluid leaking. The blocking wall 27 has a blocking surface 271. According to the first preferred embodiment of the present invention, the blocking surface 271 is concaved toward the hole 201, so that the valve body can be mounted easily.

The diameter of the hole 201 is d6. The diameter of the circle c1 is d7. The diameter of the circle c2 is d8. The inner diameter of the sealing member 301 is d9. The external diameter of the sealing member 301 is d10. The inner diameter of the sealing member 302 is d11. The external diameter of the sealing member 302 is d12. Preferably, d19≥d6; d10≤d7. d11≥d6; d12≤d8.

According to the first preferred embodiment of the present invention, d6=19 mm; d7=d8; d9=d11=21 mm; d10=d12=29.5 mm.

It is worth mentioning that the guiding element 12 can be detached from the housing 14, so that the valve body 20 can be taken out of the cavity 104 defined by the housing 14, so that the valve can be assembled easily. If one of the elements of the valve is damaged, it can be replaced.

Figure 14A:
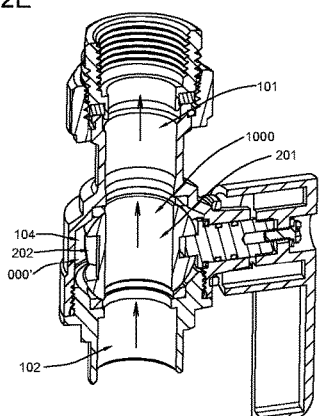
FIGS. 14A and 14B illustrate a first application of the valve according to the above first preferred embodiment of the present invention, illustrating the communication direction of the valve.
Figure 14B:
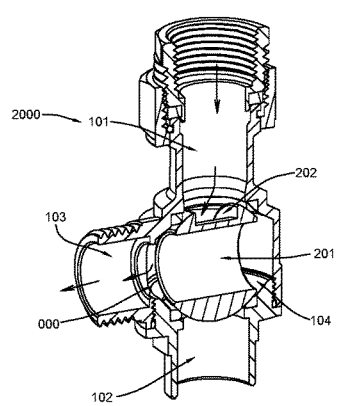

FIGS. 14A and 14B illustrate a first application of the valve according to the above first preferred embodiment of the present invention, illustrating the communication direction of the valve. As shown in FIG. 14A of the drawings, when the valve is at the first state, the channel 101 communicates with the channel 102 through the hole 201, so as to form the passage 1000. According to the first application, fluid flows from the channel 102 to the channel 101 through the hole 201. In other words, fluid flows from the channel 102 to the channel 101 along the passage 1000. The fluid passing through the passage 1000 will not enter into the space 000', and will not enter into the channel 103.

As shown in FIG. 14B of the drawings, when the valve is at the second state, the channel 101 communicates with the channel 103 through the groove 202, the space 000 and the hole 201, so as to form the passage 2000. According to the first application, fluid flows from the channel 101 to the channel 103 through the groove 202, the space 000 and the hole 201. In other words, fluid flows from the channel 101 to the channel 103 along the passage 2000. The fluid passing through the passage 2000 will not enter into the channel 102.

It is worth mentioning that the communication direction according to the first application is suitable to be applied to a water heater. When the valve is provided to a water inlet of the water heater, the guiding element 11 can be connected to the water inlet of the water heater, so that the channel 101 communicates with an internal surface of the water heater. The guiding element 12 is connected to a water supply device, so that the water supplied by the water supply device can enter into the channel 102. When the valve is at the first state, the water from the water supply device enters into the internal surface of the water heater through the passage 1000. If there are some dirt in the water heater needs to be drained, the valve can be adjusted to covert the state thereof from the first state to the second state, and then dirt in the internal surface of the water heater can be drained through the passage 2000.

Figure 15A:
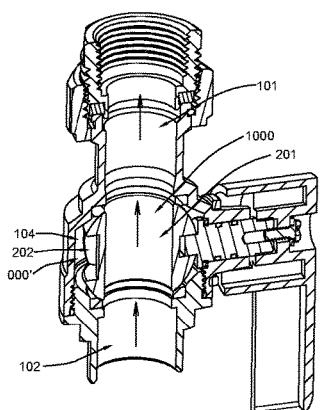
FIGS. 15A and 15B illustrate a second application of the valve according to the above first preferred embodiment of the present invention, illustrating the communication direction of the valve.
Figure 15B:
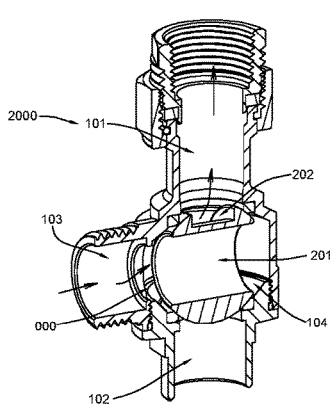

FIGS. 15A and 15B illustrate a second application of the valve according to the above first preferred embodiment of the present invention, illustrating the communication direction of the valve. As shown in FIG. 15A of the drawings, when the valve is at the first state, the channel 101 communicates with the channel 102 through the hole 201, so as to form the passage 1000. According to the first application, fluid flows from the channel 102 to the channel 101 through the hole 201. In other words, fluid flows from the channel 102 to the channel 101 along the passage 1000. The fluid passing through the passage 1000 will not enter into the space 000', and will not enter into the channel 103.

As shown in FIG. 15B of the drawings, when the valve is at the second state, the channel 101 communicates with the channel 103 through the groove 202, the space 000 and the hole 201, so as to form the passage 2000. According to the first application, fluid flows from the channel 103 to the channel 101 through the groove 202, the space 000 and the hole 201. In other words, fluid flows from the channel 103 to the channel 101 along the passage 2000. The fluid passing through the passage 2000 will not enter into the channel 102.

It is worth mentioning that the communication direction according to the second application provides two selectable fluid inlet channels 102 and 103, and one fluid outlet channel 101, so that the guiding element 11 can be connected to a fluid requiring device, and the guiding elements 12 and 13 can be connected to two different fluid supply devices respectively, so that fluid from the two fluid supply devices can be selectively transported into the fluid requiring device according to two different requirements.

FIGS. 16A and 16B illustrate a third application of the valve according to the above first preferred embodiment of the present invention, illustrating the communication direction of the valve. As shown in FIG. 16A of the drawings, when the valve is at the first state, the channel 101 communicates with the channel 102 through the hole 201, so as to form the passage 1000. According to the first application, fluid flows from the channel 101 to the channel 102 through the hole 201. In other words, fluid flows from the channel 101 to the channel 102 along the passage 1000. The fluid passing through the passage 1000 will not enter into the space 000', and will not enter into the channel 103.

As shown in FIG. 16B of the drawings, when the valve is at the second state, the channel 101 communicates with the channel 103 through the groove 202, the space 000 and the hole 201, so as to form the passage 2000. According to the first application, fluid flows from the channel 101 to the channel 103 through the groove 202, the space 000 and the hole 201. In other words, fluid flows from the channel 101 to the channel 103 along the passage 2000. The fluid passing through the passage 2000 will not enter into the channel 102.

It is worth mentioning that the communication direction according to the third application provides two selectable fluid outlet channels 102 and 103, and one fluid inlet channel 101, so that the guiding element 11 can be connected to a fluid supply device, and the guiding elements 12 and 13 can be connected to two different fluid requiring devices respectively, so that fluid from the fluid requiring device can be selectively transported into the two fluid supply devices according to two different requirements.

FIGS. 17A and 17B illustrate a fourth application of the valve according to the above first preferred embodiment of the present invention, illustrating the communication direction of the valve. As shown in FIG. 17A of the drawings, when the valve is at the first state, the channel 101 communicates with the channel 102 through the hole 201, so as to form the passage 1000. According to the first application, fluid flows from the channel 101 to the channel 102 through the hole 201. In other words, fluid flows from the channel 101 to the channel 102 along the passage 1000. The fluid passing through the passage 1000 will not enter into the space 000', and will not enter into the channel 103.

As shown in FIG. 17B of the drawings, when the valve is at the second state, the channel 101 communicates with the channel 103 through the groove 202, the space 000 and the hole 201, so as to form the passage 2000. According to the first application, fluid flows from the channel 103 to the channel 101 through the groove 202, the space 000 and the hole 201. In other words, fluid flows from the channel 103 to the channel 101 along the passage 2000. The fluid passing through the passage 2000 will not enter into the channel 102.

It is worth mentioning that the communication direction according to the fourth application is also suitable to be applied to a water heater. When the valve is provided to a water inlet of the water heater, the guiding element 11 can be connected to the water inlet of the water heater, so that the channel 101 communicates with an internal surface of the water heater. The guiding element 13 is connected to a water supply device, so that the water supplied by the water supply device can enter into the channel 103. When the valve is at the second state, the water from the water supply device enters into the internal surface of the water heater through the passage 2000. If there are some dirt in the water heater needs to be drained, the valve can be adjusted to covert the state thereof from the second state to the first state, and then dirt in the internal surface of the water heater can be drained through the passage 1000.

Figure 19:
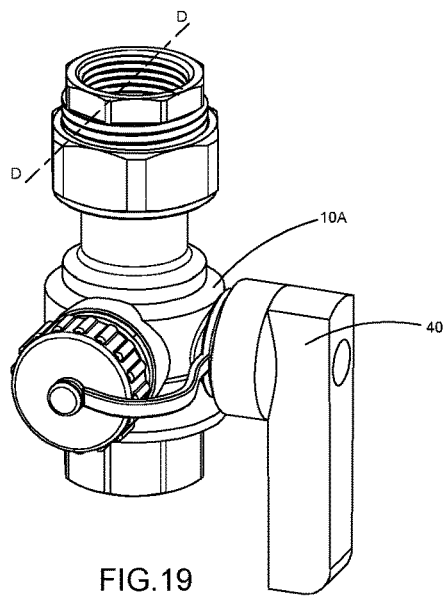
FIG. 19 is a perspective view of the valve according to the above first alternative mode of the above first preferred embodiment of the present invention.
Figure 20:
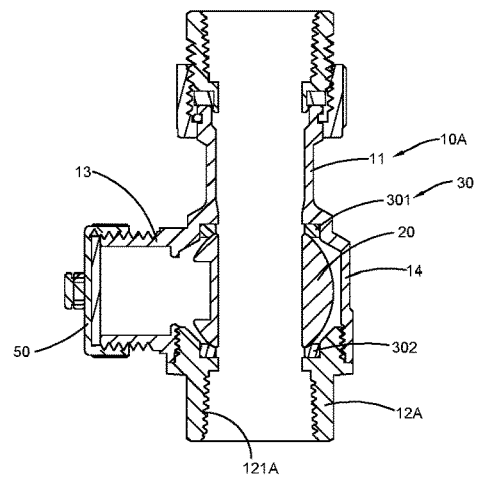
FIG. 20 is a sectional view of the valve according to the above first alternative mode of the above first preferred embodiment of the present invention.

FIGS. 18 to 20 illustrate a valve according to a first alternative mode of the above first preferred embodiment of the present invention. The valve comprises a fluid guiding element 10A, a valve body 20, a plurality of sealing members 30, an adjusting element 40, a cap 50 and a connection element 60. The sealing members 30 comprise two sealing members 301 and 302 being provided between the valve body 20 and the fluid guiding element 10A. The fluid guiding element 10A comprises three guiding elements 11, 12A, 13 and a housing 14.

What is different from the above first preferred embodiment of the present invention, an internal thread structure 121A is provided to the guiding element 12A, as shown in FIG. 20.

Figure 21:
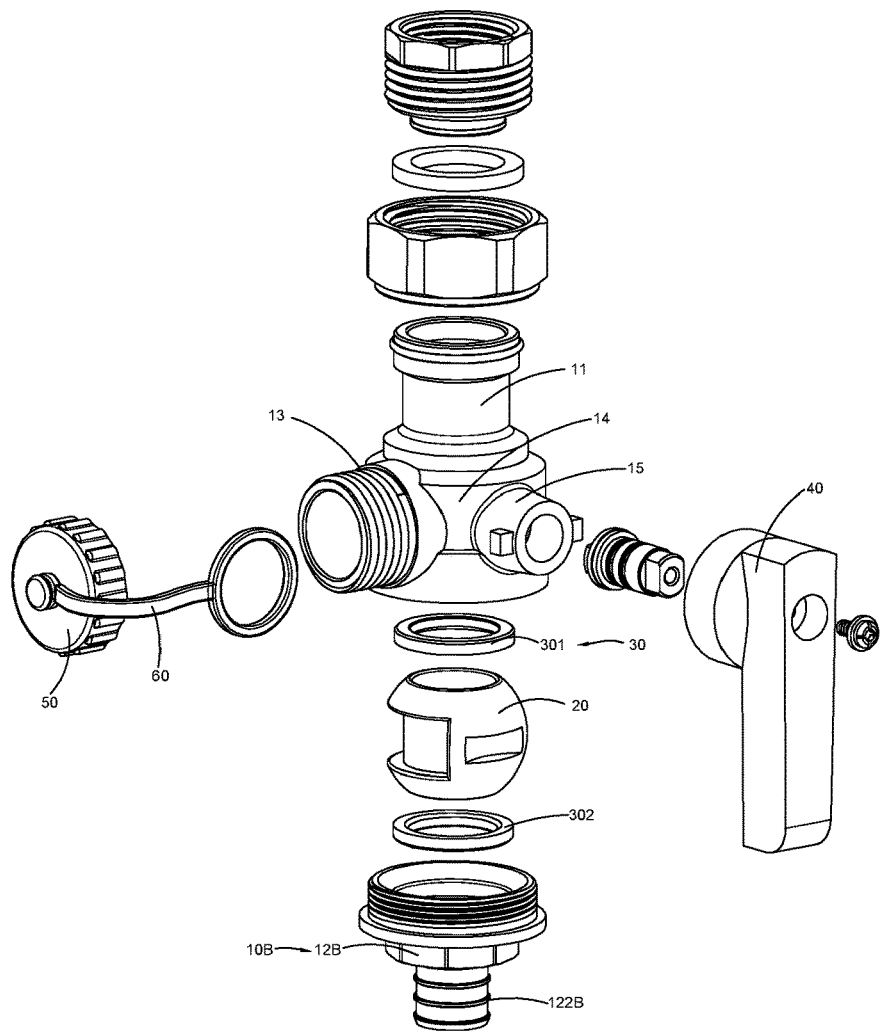
FIG. 21 is an explosive perspective view of a valve according to a second alternative mode of the above first preferred embodiment of the present invention.
Figure 22:
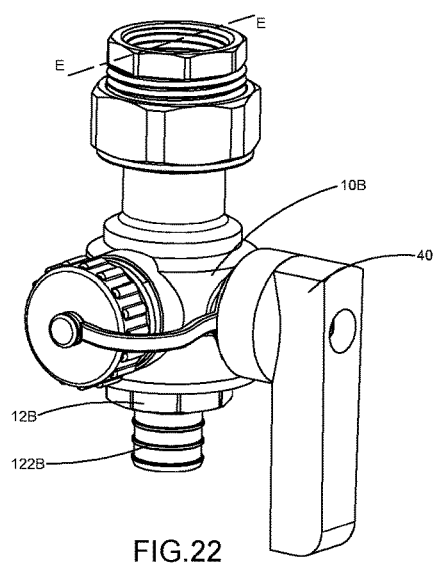
FIG. 22 is a perspective view of the valve according to the above second alternative mode of the above first preferred embodiment of the present invention.
Figure 23:
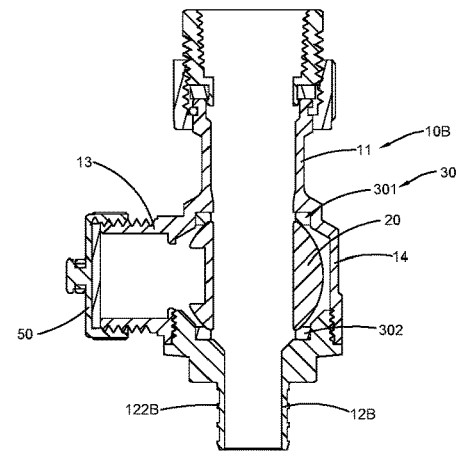
FIG. 23 is a sectional view of the valve according to the above second alternative mode of the above first preferred embodiment of the present invention.
Figure 24:
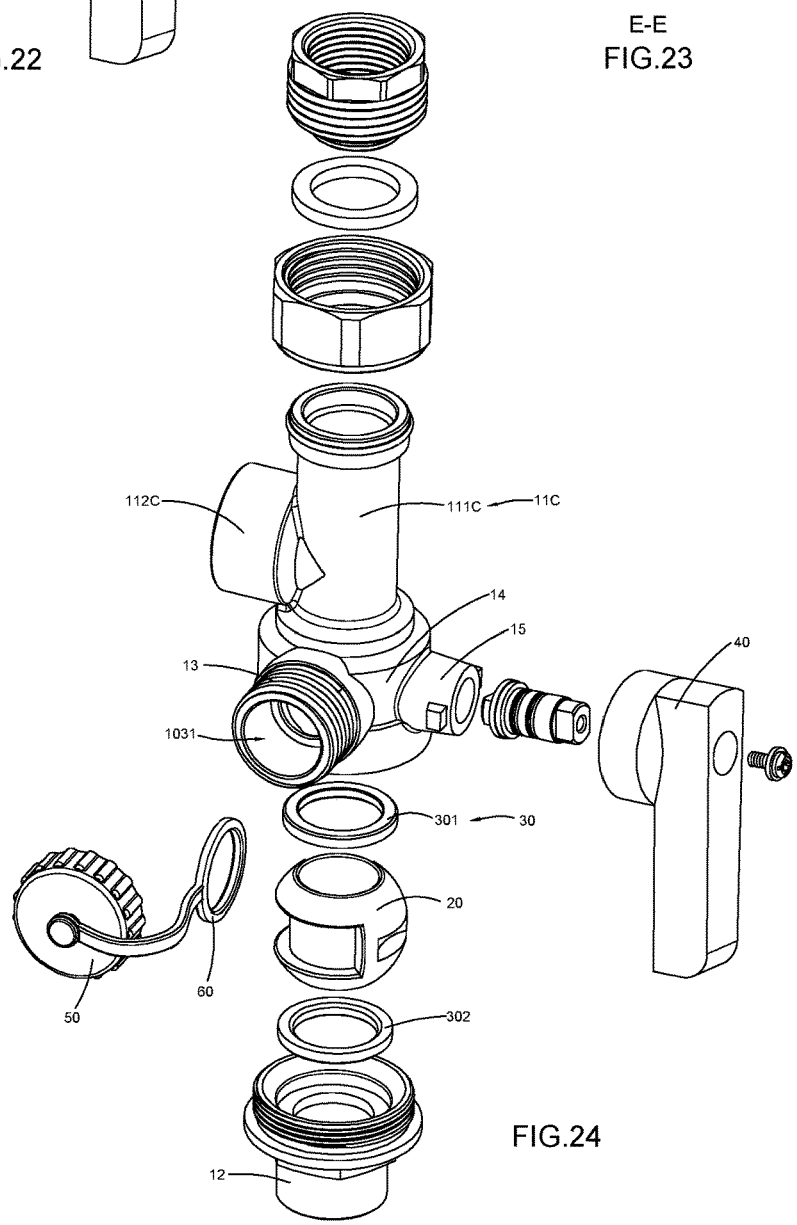
FIG. 24 is an explosive perspective view of a valve according to a second preferred embodiment of the present invention.

FIGS. 21 to 23 illustrate a valve according to a second alternative mode of the above first preferred embodiment of the present invention. The valve comprises a fluid guiding element 10B, a valve body 20, a plurality of sealing members 30, an adjusting element 40, a cap 50 and a connection element 60. The sealing members 30 comprise two sealing members 301 and 302 being provided between the valve body 20 and the fluid guiding element 10B. The fluid guiding element 10B comprises three guiding elements 11, 12B, 13 and a housing 14.

What is different from the above first preferred embodiment of the present invention, a holding structure 122B is provided to the guiding elements 12B, as shown in FIGS. 21 to 23.

FIGS. 24 to 28B illustrate a valve according to a second preferred embodiment of the present invention. The valve comprises a fluid guiding element 10C, a valve body 20, a plurality of sealing members 30, an adjusting element 40, a cap 50 and a connection element 60. The sealing members 30 comprise two sealing members 301 and 302 being provided between the valve body 20 and the fluid guiding element 10C. The fluid guiding element 10C comprises three guiding elements 11C, 12, 13 and a housing 14. The guiding elements 11C, 12, and 13 respectively provide channels 101C, 102 and 103.

Figure 25:
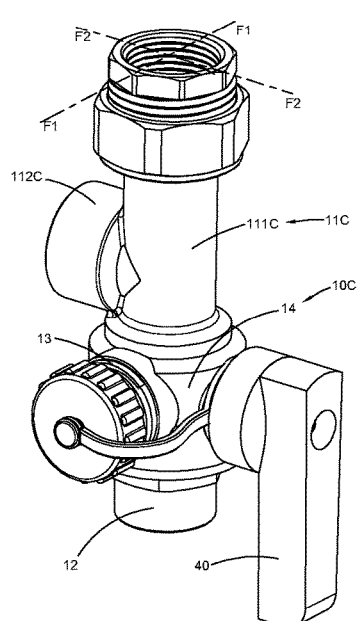
FIG. 25 is a perspective view of the valve according to the above second preferred embodiment of the present invention, illustrating a first state of the valve.

What is different from the above first preferred embodiment of the present invention, the channel 101C has two channel openings 1011C and 1012C. In detail, the guiding element 11C comprises two sub-guiding elements 111C and 112C. The two sub-guiding elements 111C and 112C respectively provide the two channel openings 1011C and 1012C. In more detail, the channel opening 1011C is defined by the sub-guiding element 111C. The channel opening 1012C is defined by the sub-guiding element 112C. The sub-guiding element 111C integrally extends from the housing 14 in +z direction, as illustrated in FIG. 25. The sub-guiding element 112C integrally extends from sub-guiding element 111C in a side direction of the sub-guiding element 111C.

Figure 26A:
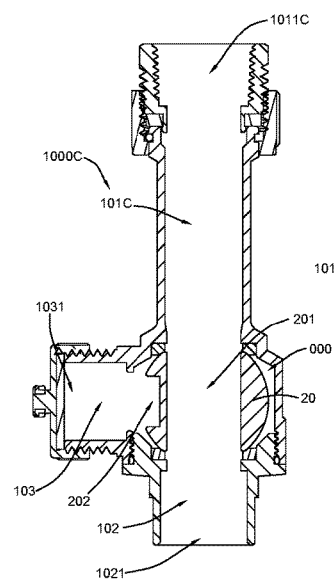
FIGS. 26A and 26B are sectional views of the valve according to the above second preferred embodiment of the present invention, illustrating the first state of the valve.
Figure 26B:
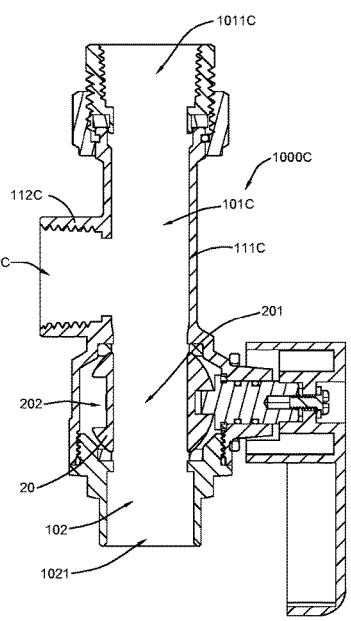
Figure 27:
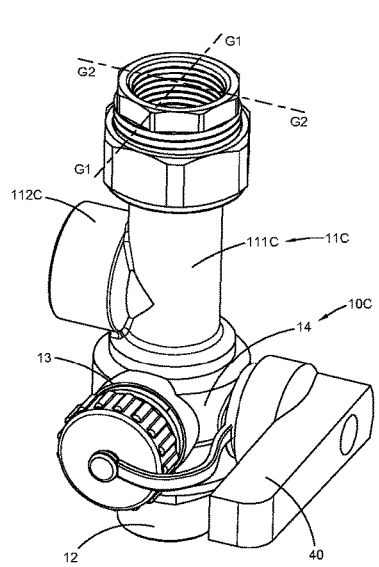
FIG. 27 is a perspective view of the valve according to the above second preferred embodiment of the present invention, illustrating a second state of the valve.

As shown in FIGS. 26A and 26B, the channel 102 has a channel opening 1021. The channel 103 has a channel opening 1031. The valve body 20 provides a hole 201 and a groove 202.

Referring to FIGS. 26A and 26B, at a first state of the valve, the channel 101C communicates with the channel 102 through the hole 201, so that the channel opening 1011C and 1012C communicate with the channel opening 1021 through a passage 1000C formed by the channel 101C, the hole 201 and the channel 102. As shown in FIG. 26A, when the valve is at the first state, the channel 103 does not communicate with the passage 1000C, and the channel opening 1031 does not communicate with the channel opening 1011C, 1012C and 1021.

Figure 28A:
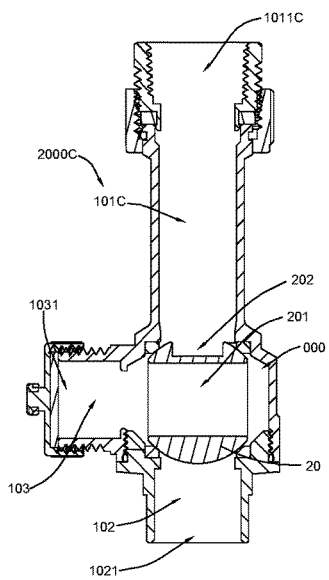
FIGS. 28A and 28B are sectional views of the valve according to the above second preferred embodiment of the present invention, illustrating a second state of the valve.
Figure 28B:
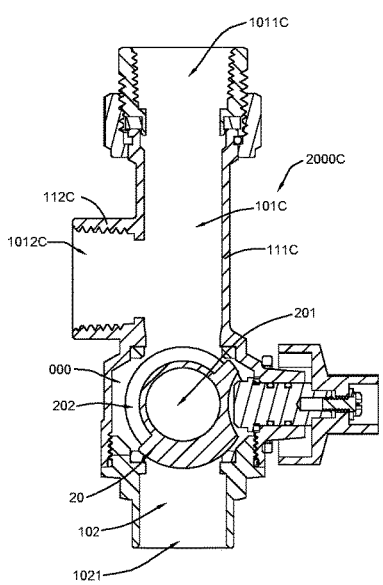

Referring to FIGS. 28A and 28B, at a second state of the valve, the channel 101C communicates with the channel 103 through the groove 202 and a space 000, so that the channel opening 1011C and 1012C communicate with the channel opening 1031 through a passage 2000C formed by the channel 101C, the groove 202, the space 000 and the channel 103. As shown in FIG. 28A and FIG. 28B, when the valve is at the second state, the channel 102 does not communicate with the passage 2000C, and the channel opening 1021 does not communicate with the channel opening 1011C, 1012C and 1031.

FIG. 29 to FIG. 31 illustrate a valve according to a first alternative mode of the above second preferred embodiment of the present invention. The valve comprises a fluid guiding element 10D, a valve body 20, a plurality of sealing members 30, an adjusting element 40, a cap 50 and a connection element 60. The sealing members 30 comprise two sealing members 301 and 302 being provided between the valve body 20 and the fluid guiding element 10D. The fluid guiding element 10D comprises three guiding elements 11D, 12D, 13 and a housing 14. The guiding elements 11D, 12D, and 13 respectively provide channels 101D, 102D and 103.

What is different from the above second preferred embodiment of the present invention, an internal thread structure 121D is provided to the guiding element 12D, as shown in FIG. 31.

FIGS. 32 to 34 illustrate a valve according to a second alternative mode of the above second preferred embodiment of the present invention. The valve comprises a fluid guiding element 10E, a valve body 20, a plurality of sealing members 30, an adjusting element 40, a cap 50 and a connection element 60. The sealing members 30 comprise two sealing members 301 and 302 being provided between the valve body 20 and the fluid guiding element 10E. The fluid guiding element 10E comprises three guiding elements 11E, 12E, 13 and a housing 14. The guiding elements 11E, 12E, and 13 respectively provide channels 101E, 102E and 103.

What is different from the above second preferred embodiment of the present invention is a holding structure 122E is provided to the guiding elements 12E, as shown in FIG. 32 to FIG. 34.

Figure 35A:
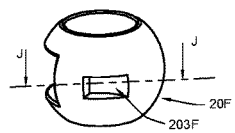
FIG. 35A is a perspective view of a valve body for a valve according to a third preferred embodiment of the present invention.
Figure 35B:
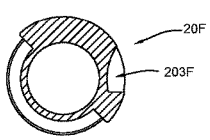
FIG. 35B is a sectional view of the valve body according to the above third preferred embodiment of the present invention.

FIGS. 35A and 35B illustrate a valve body 20F for a valve according to a third preferred embodiment of the present invention. The valve body 20F provides a fixing cave 203F. The shape and size of fixing cave 203F match well with the shape and size of a fixing portion of a fixing element in a predetermined direction, so as to avoid the valve body 20 being mounted on backward.

Figure 36A:
FIG. 36A is sectional view of a valve body for a valve according to a fourth preferred embodiment of the present invention.
Figure 36B:
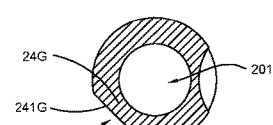
FIG. 36B is sectional view of the valve body for the valve according to the above fourth preferred embodiment of the present invention.

FIGS. 36A to 36B illustrates a valve body 20G for a valve according to a fourth preferred embodiment of the present invention. As shown in FIG. 36A, the valve body 20G is embodied as a ball being provided with a hole 201 and a groove 202G. It is worth mentioning that, the groove 202G is defined only by a side wall 24G separating the hole 201 and the groove 202G. In detail, the groove 202G is defined only by a side surface 241G of the side wall 24G.

According to the above fourth preferred embodied of the present invention, the side surface 241G is a flat surface, and the groove 202G is not sunken.

Figure 37A:
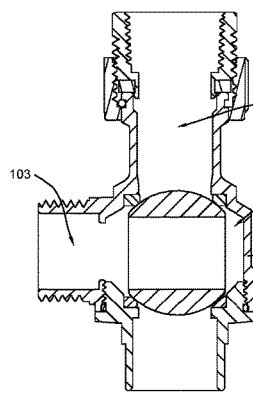
FIGS. 37A and 37B are sectional views of the valve according to the above fourth preferred embodiment of the present invention, illustrating a second state of the valve.
Figure 37B:
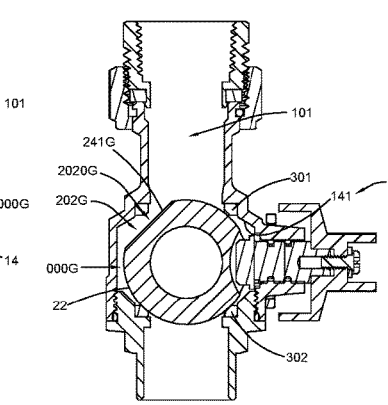
Figure 38:
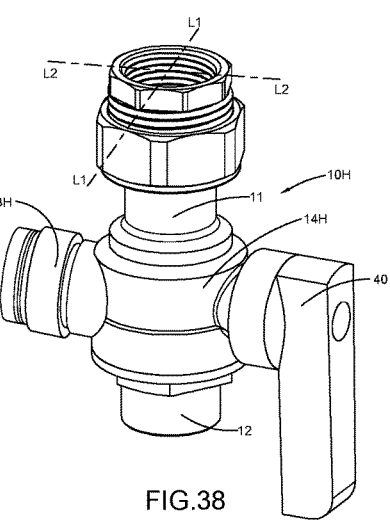
FIG. 38 is a perspective view of a valve according to a fifth preferred embodiment of the present invention, illustrating a first state of the valve.
Figure 39A:
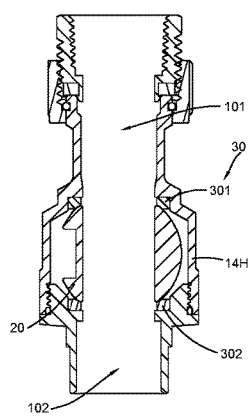
FIGS. 39A and 39B are sectional views of the valve according to the above fifth preferred embodiment of the present invention, illustrating the first state of the valve.
Figure 39B:
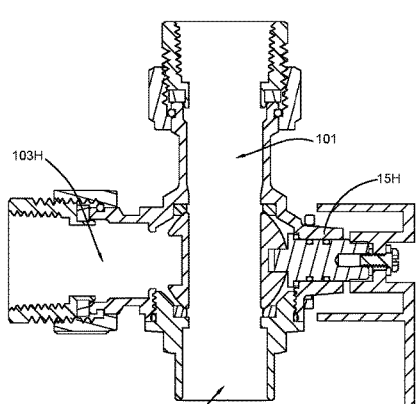

Referring to FIGS. 37A and 37B of the drawings, at a second state of the valve, a gap 2020G is formed between the side surface 241G and the sealing members 301, so as to communicate the channel 101 and a space 000G formed between an external surface 22 and a cavity surface 141 of the housing 14, and further communicate the channel 101 and the channel 103. In other words, the groove 202G forms the gap 2020G, when the valve is at the second state.

It is worth mentioning that the groove according to the present invention refers to a space formed to a valve body of a valve, which forms a gap between the valve body and the sealing members 301, at a state of the valve.

FIGS. 38 to 41B illustrate a valve according to a fifth preferred embodiment of the present invention. The valve comprises a fluid guiding element 10H, a valve body 20, a plurality of sealing members 30 and an adjusting element 40. The sealing members 30 comprise two sealing members 301 and 302 being provided between the valve body 20 and the fluid guiding element 10H. The fluid guiding element 10H comprises three guiding elements 11, 12, 13H, a housing 14H and a through hole wall 15 H. The guiding elements 11, 12, and 13H respectively provide channels 101, 102 and 103H.

Figure 40:
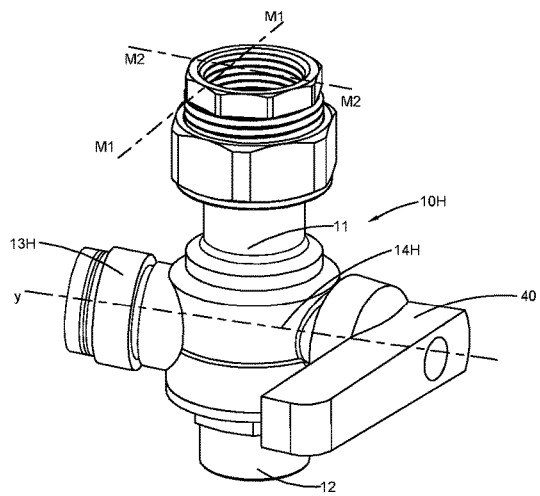
FIG. 40 is a perspective view of the valve according to the above fifth preferred embodiment of the present invention, illustrating a second state of the valve.
Figure 41A:
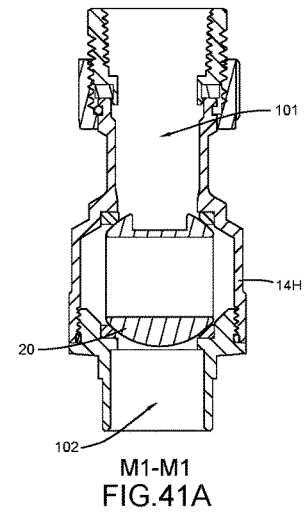
FIGS. 41A and 41B are sectional views of the valve according to the above fifth preferred embodiment of the present invention, illustrating the second state of the valve.
Figure 41B:
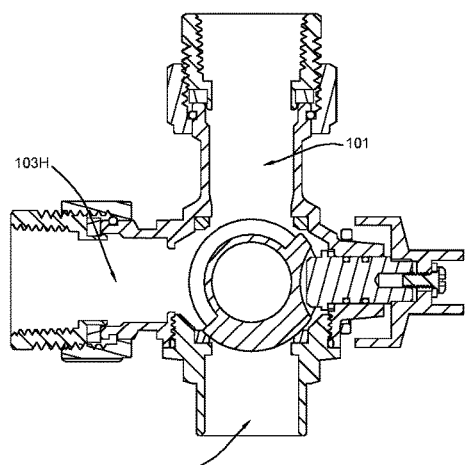

What is different from the above first preferred embodiment of the present invention is that the guiding element 13H and the through hole wall 15H extend in opposite direction along y-axis, as shown in FIG. 40 of the drawings.

FIGS. 42 to 45B illustrate a valve according to a sixth preferred embodiment of the present invention. The valve comprises a fluid guiding element 10I, a valve body 20, a plurality of sealing members 30, an adjusting element 40, a cap 50 and a connection element 60. The sealing members 30 comprise two sealing members 301 and 302 being provided between the valve body 20 and the fluid guiding element 10I.

Figure 42:
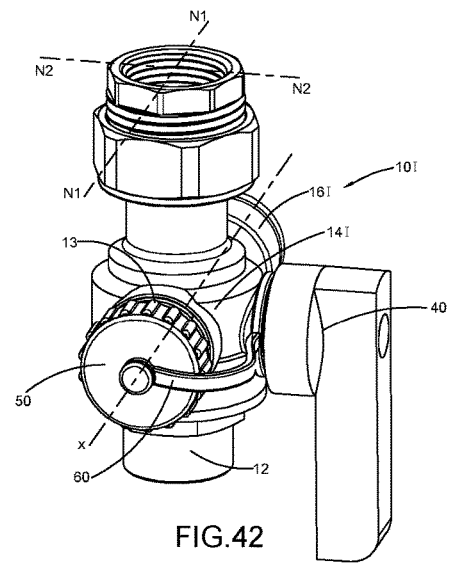
FIG. 42 is a perspective view of a valve according to a sixth preferred embodiment of the present invention, illustrating a first state of the valve.
Figure 43A:
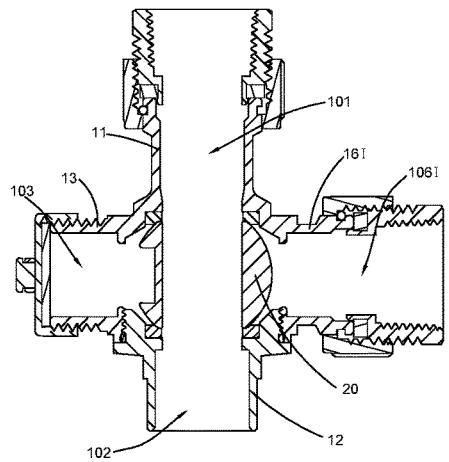
FIGS. 43A and 43B are sectional views of the valve according to the above sixth preferred embodiment of the present invention, illustrating the first state of the valve.
Figure 43B:
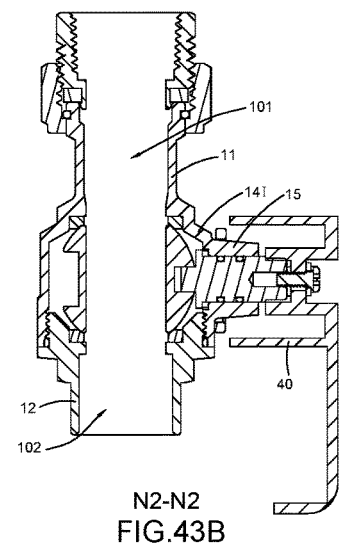
Figure 44:
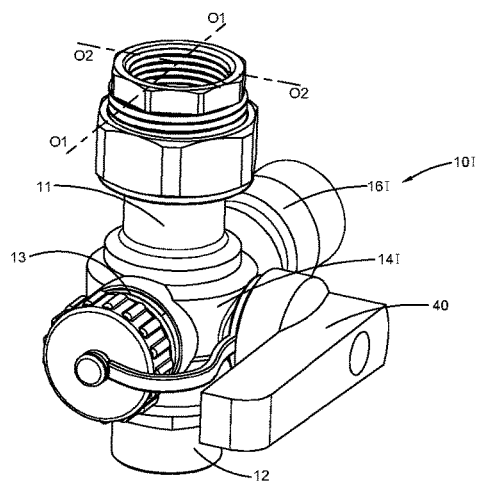
FIG. 44 is a perspective view of a valve according to the above sixth preferred embodiment of the present invention, illustrating a second state of the valve.
Figure 45A:
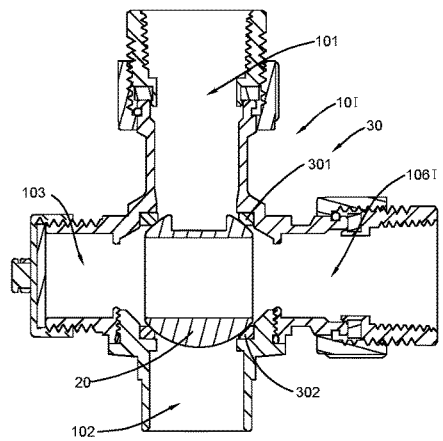
FIGS. 45A and 45B are sectional views of the valve according to the above sixth preferred embodiment of the present invention, illustrating the second state of the valve.
Figure 45B:
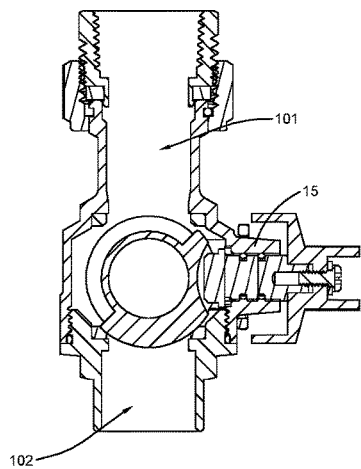

What is different from the above first preferred embodiment of the present invention is that the fluid guiding element 10I comprises four guiding elements 11, 12, 13, 16I, a housing 14I and a through hole wall 15. The guiding elements 11, 12, 13 and 16I respectively provide channels 101, 102,103 and 106I. The guiding element 13 and 16I extend in opposite direction along x-axis, as shown in FIG. 42 of the drawings.

FIGS. 46 to 49B illustrate a valve according to a seventh preferred embodiment of the present invention. The valve comprises a fluid guiding element 10J, a valve body 20, a plurality of sealing members 30, an adjusting element 40, a cap 50 and a connection element 60. The sealing members 30 comprise two sealing members 301 and 302 being provided between the valve body 20 and the fluid guiding element 10J.

Figure 46:
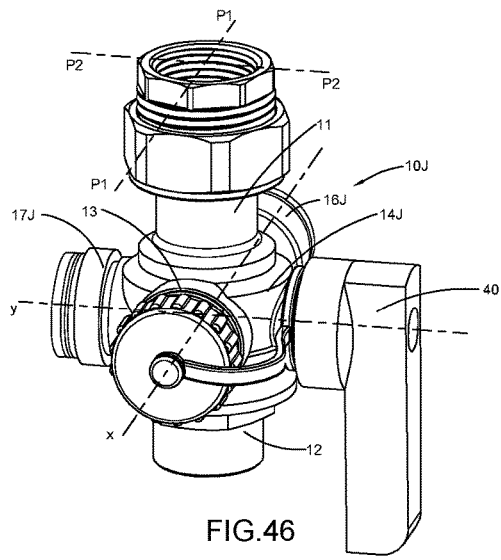
FIG. 46 is a perspective view of a valve according to a seventh preferred embodiment of the present invention, illustrating a first state of the valve.
Figure 47A:
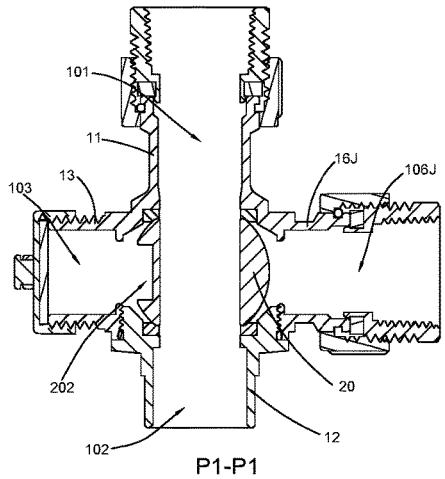
FIGS. 47A and 47B are sectional views of the valve according to the above seventh preferred embodiment of the present invention, illustrating the first state of the valve.
Figure 47B:
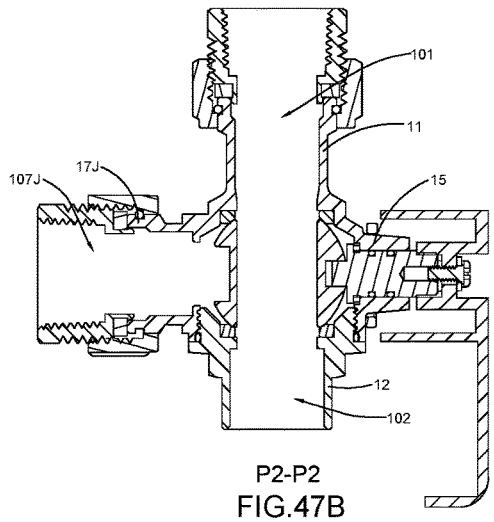
Figure 53:
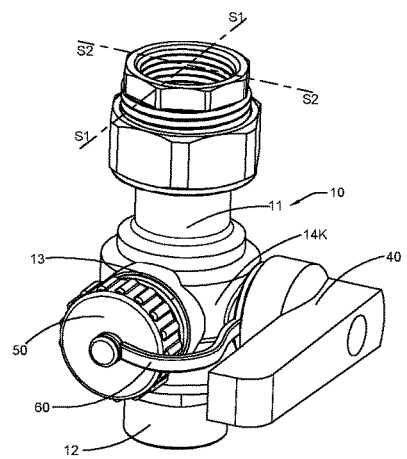
FIG. 53 is a perspective view of a valve body according to the above eighth preferred embodiment of the present invention, illustrating a second state of the valve.
Figure 54A:
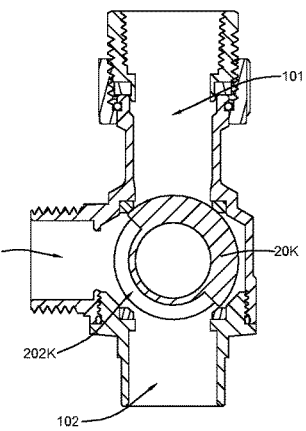
FIGS. 54A and 54B are sectional views of the valve according to the above eighth preferred embodiment of the present invention, illustrating the second state of the valve.
Figure 54B:
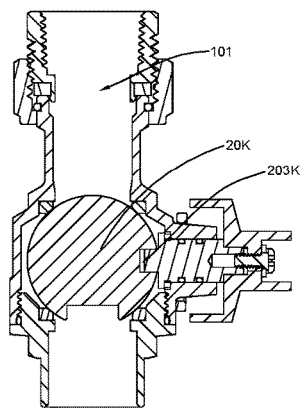

What is different from the above first preferred embodiment of the present invention, the fluid guiding element 10J comprises fifth guiding elements 11, 12, 13, 16J and 17J, a housing 14J and a through hole wall 15. The guiding elements 11, 12,13 16J and 17J respectively provide channels 101, 102,103,106 and 107J. The guiding element 13 and 16J extend in opposite direction along x-axis, and the guiding element 17J and the through hole wall 15 extend in opposite direction along y-axis, as shown in FIG. 46 of the drawings.

FIGS. 50 to 54B illustrate a valve according to an eighth preferred embodiment of the present invention. The valve comprises a fluid guiding element 10, a valve body 20K, a plurality of sealing members 30, an adjusting element 40, a cap 50 and a connection element 60. The sealing members 30 comprise two sealing members 301 and 302 being provided between the valve body 20K and the fluid guiding element 10. The fluid guiding element 10 comprises three guiding elements 11, 12, 13 and housing 14.

The valve body 20K is embodied as a ball providing a groove 202K and a fixing cave 203K, as shown in FIG. 50 of the drawings.

The adjusting element 40 is extended into the fixing cave 203K, so that the adjusting element 40 can be used to drive the valve body 20K to rotate with respect to y-axis. The groove 202K is provided to surround y-axis, so that the communication between the channel 101 and the channel 103 and the communication between the channel 102 and the channel 103 can be selected and adjusted, as shown in FIG. 51, FIG. 52A and FIG. 52B of the drawings.

Figure 55:
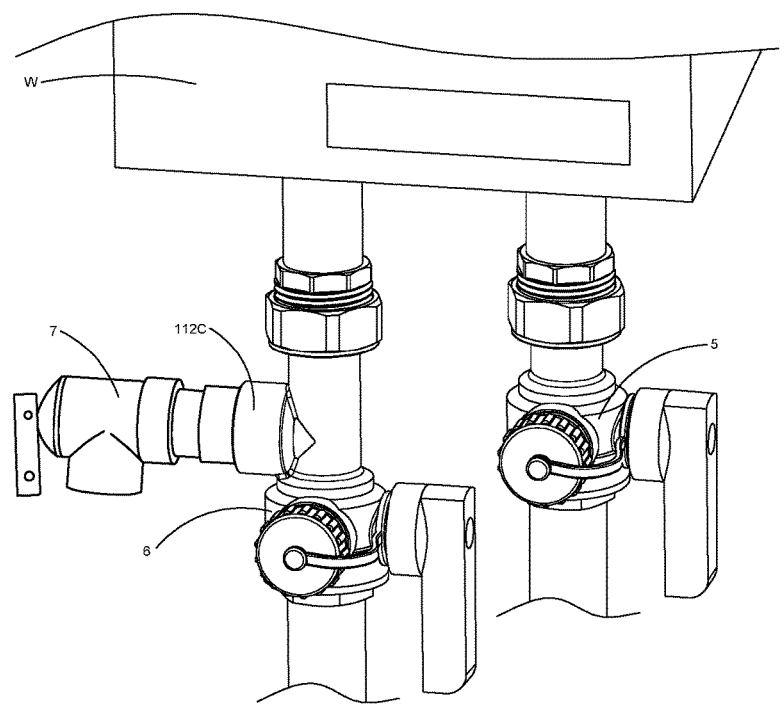
FIGS. 55 to 57 illustrate an application of the valves according to the present invention.
Figure 56:
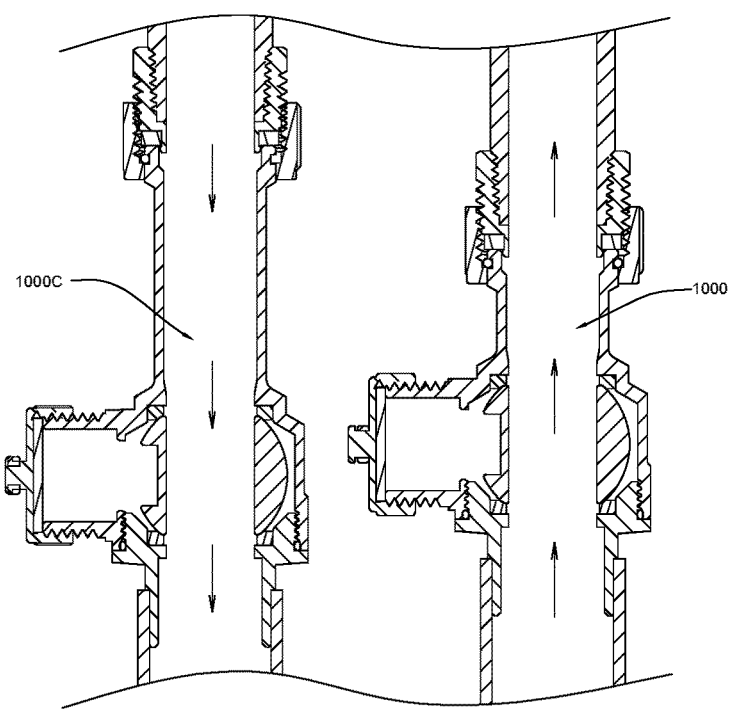
Figure 57:
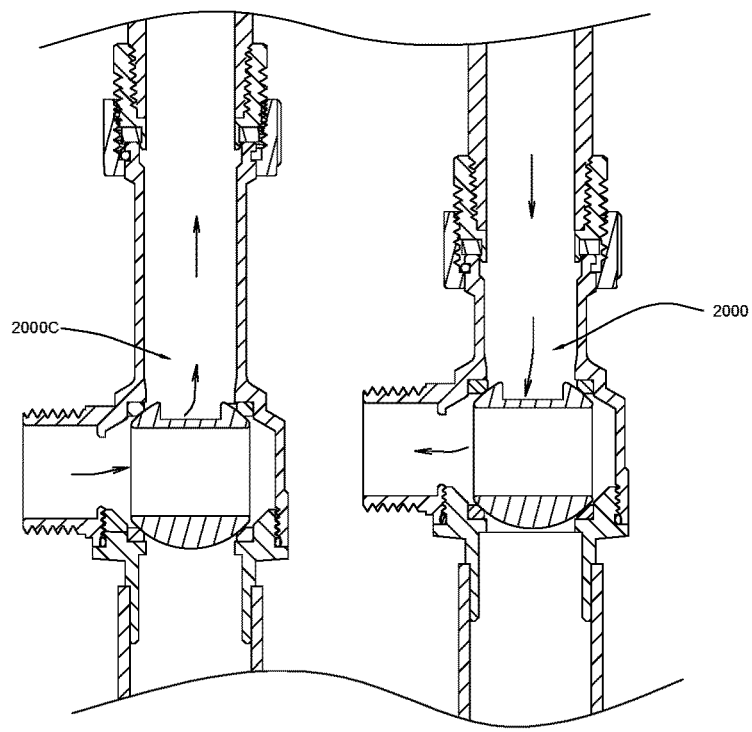

FIGS. 55 to 57 illustrate an application of the valves according to the present invention. The valve 5 according to the first preferred embodiment of the present invention is connected to an inlet of a water heater W. The valve 6 according to the second preferred embodiment of the present invention is connected to an outlet of the water heater. As shown in FIG. 56, the valve 5 is adjusted to a first state thereof. The valve 6 is adjusted to a first state thereof. Cold water enters into the water heater W through the passage 1000 of the valve 5 formed at the first state thereof. The cold water is heated in the water heater W and then flows out of the water heater W through the passage 1000C of the valve 6 formed at the first state thereof.

Referring to FIG. 55 of the drawings, a relief valve 7 is provided to the sub-guiding elements 111C, so as to ensure the safe of the application of the water heater W.

As shown in FIG. 57, the valve 5 is adjusted to a second state thereof, and the valve 6 is adjusted to a second state thereof, so as to wash the water heater W. Washing water enters into the water heater W through the passage 2000C of the valve 6 formed at the second state thereof, and then flows out of the water heater W through the passage 2000 of the valve 5 formed at the second state thereof.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A valve, comprising:
    a valve body having a through hole and an open groove provided in an outer surface of the valve body, wherein the through hole and the open groove are separated from each other;
    a fluid guiding element having a cavity, a first channel, a second channel and a third channel, wherein the valve body is rotatably mounted within the cavity such that the valve has a first state and a second state, wherein when the valve is in the first state, the valve body is rotated to communicate respectively the through hole of the valve body with the first channel and the second channel of the fluid guiding element, wherein when the valve is in the second state, the valve body is rotated to communicate respectively the through hole of the valve body with the first channel and the third channel, wherein said fluid guiding element comprises a housing, a first guiding member, a second guiding member and a third guiding member, wherein said first guiding member, said second guiding member and said third guiding member are respectively extended from said housing, wherein said first guiding member, said second guiding member and said third guiding member respectively form the first channel, the second channel and the third channel, wherein said first guiding member and the second guiding member are respectively extended from the housing in two opposite directions, wherein the third guiding member and the first guiding member are perpendicular with each other,
    a first sealing member and a second sealing member, wherein the first sealing member is mounted at the first guiding member, wherein said second sealing member is mounted at said second guiding member, wherein said first sealing member and said second sealing member are respectively mounted in two opposing positions, wherein said valve body is securely held in a position within the cavity by the first sealing member and the second sealing member, wherein the valve body has a sealing region, wherein the sealing region is formed on the outer surface of the valve body, wherein said through hole has a first hole opening and a second hole opening, wherein said first hole opening and the second hole opening are opposite with each other, wherein the first sealing member is a sealing ring and has an inner diameter $d_1$, the first hole opening has an inner diameter $d_2$, wherein $d_1 \geq d_2$, wherein the second sealing member is a sealing ring and has an inner diameter $d_3$, said second hole opening has an inner diameter $d_4$, wherein $d_3 \geq d_4$; and
    an adjusting element arranged for driving the valve body to rotate between the first state and the second state, wherein the open groove has at least one outer edge, wherein when the valve is in the first state, the first sealing member is provided between the outer edge and the first hole opening, and the second sealing member is provided between the outer edge and the second hole opening.

2. The valve, as recited in claim 1, wherein when the valve is in the second state, sealing region is surrounded by said second sealing member, and said first channel is communicated with a space defined between the outer surface of the valve body and the housing.

3. The valve, as recited in claim 1, wherein when the valve is in the second state, said first channel is communicated with said third channel through a space defined between the outer surface of the valve body and the housing.

4. The valve, as recited in claim 3, wherein the valve body has a surrounding wall and a side wall, wherein said open groove is defined by the surrounding wall and the side wall, and said side wall separates said through hole from said open groove.

5. The valve, as recited in claim 4, wherein the first channel has two openings.

\* \* \* \* \*